US009426035B2

(12) United States Patent
Shetty et al.

(10) Patent No.: US 9,426,035 B2
(45) Date of Patent: Aug. 23, 2016

(54) DATA REPORTING USING REPORTING GROUPS IN A COMPUTER NETWORK

(75) Inventors: Sandeep Jay Shetty, San Jose, CA (US); Shmuel Shaffer, Palo Alto, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 886 days.

(21) Appl. No.: 12/971,076

(22) Filed: Dec. 17, 2010

(65) Prior Publication Data
US 2012/0158933 A1    Jun. 21, 2012

(51) Int. Cl.
G06F 15/173 (2006.01)
H04L 12/24 (2006.01)
G06F 15/16 (2006.01)

(52) U.S. Cl.
CPC ............ H04L 41/12 (2013.01); H04L 41/0893 (2013.01)

(58) Field of Classification Search
CPC ............... H04L 41/0213; H04L 29/08072; H04L 29/06
USPC ......................................................... 709/223
See application file for complete search history.

(56) References Cited

U.S. PATENT DOCUMENTS

| 7,171,491 | B1 * | 1/2007 | O'Toole et al. | ............... 709/244 |
| 7,185,077 | B1 | 2/2007 | O'Toole et al. | |
| 7,260,518 | B2 | 8/2007 | Kerr et al. | |
| 7,475,156 | B2 | 1/2009 | Kerr et al. | |
| 7,631,055 | B1 | 12/2009 | Stamler et al. | |
| 2003/0048183 | A1 * | 3/2003 | Vollmer et al. | ............... 340/506 |
| 2006/0291404 | A1 * | 12/2006 | Thubert et al. | ............... 370/254 |
| 2009/0010276 | A1 * | 1/2009 | Yonge et al. | ............... 370/447 |
| 2009/0196304 | A1 * | 8/2009 | Sayenko | ............... 370/432 |

OTHER PUBLICATIONS

Thubert, "RPL Objective Function 0,", <draft-ietf-roll-of0-03>, Jul. 29, 2010 version.
Vasseur et al., "Routing Metrics Used for Path Calculation in Low Power and Lossy Networks," <draft-ietf-roll-routing-metrics-12>, Nov. 10, 2010 version.
Winter et al., "RPL: IPv6 Routing Protocol for Low Power and Lossy Networks," <draft-ietf-roll-rpl-15>, Nov. 11, 2010 version.

* cited by examiner

*Primary Examiner* — Chris Parry
*Assistant Examiner* — Alan S Chou
(74) *Attorney, Agent, or Firm* — Parker Ibrahim & Berg LLC; James M. Behmke; Stephen D. LeBarron

(57) ABSTRACT

In one embodiment, a node may determine a topology of a plurality of reporting nodes within a directed acyclic graph (DAG) in a computer network. The reporting nodes may then be assigned to one of a plurality of reporting groups, where reporting nodes are allowed to report only during designated time windows corresponding to their assigned reporting group. The reporting nodes may then be informed of at least their own assignment to a particular reporting group. In another embodiment, a particular reporting node may join the DAG, and may also receive an assignment to one of a plurality of reporting groups. Accordingly, the particular reporting node may also determine designated time windows corresponding to the assigned reporting group, where the particular reporting node is allowed to report only during the designated time windows.

20 Claims, 25 Drawing Sheets

DATA REPORTING USING REPORTING GROUPS IN A COMPUTER NETWORK

TECHNICAL FIELD

The present disclosure relates generally to computer networks, and, more particularly, to directed acyclic graph (DAG) routing and contention management.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

Certain LLNs, such as advanced metering infrastructure (AMI) systems used to collect meter readings, as well as other data reporting networks, can be very large in scale. For example, a single collector/access point can serve thousands of meters while an AMI system with multiple collectors may service millions of meters. In addition, in a mesh field area network (FAN), congestion of packets carrying data (reporting/metered data) can be a significant issue, where data packets from/to a given meter may have to contend with multiple (at times hundreds) of packets from other meters over each radio mesh link. Though reporting data may be generated (sensed/metered) at a frequent interval (e.g., every few minutes), to reduce congestion and provide a more scalable system, reporting data is currently stored at the originating reporting device, and transmitted at a less frequent rate (e.g., every eight hours). This less frequent rate, however, is random with respect to other meters, and may still jeopardize the efficiency of the network by causing collisions where the less frequent rate still overlaps reporting transmissions from other nodes in the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
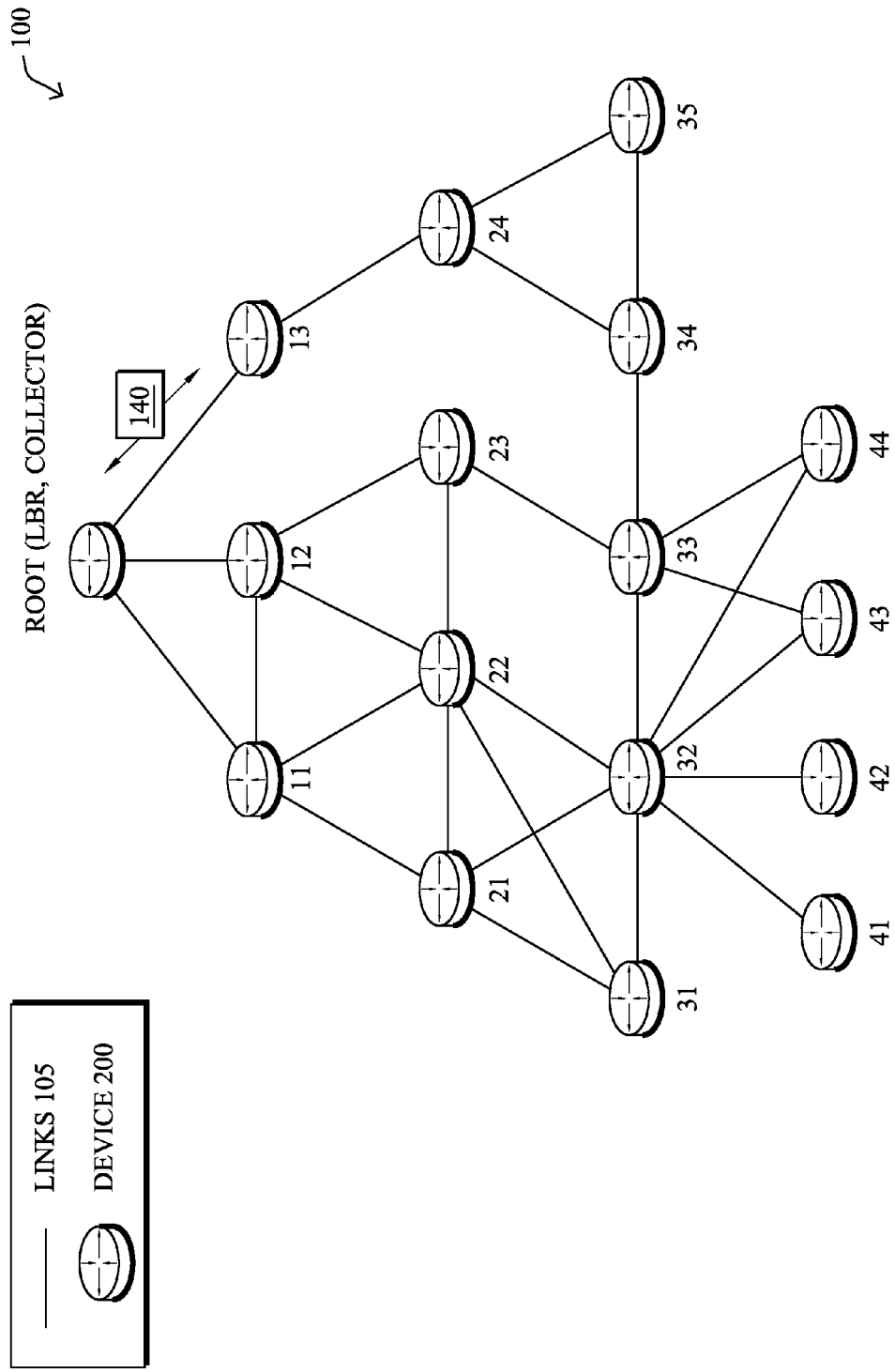
FIG. 1 illustrates an example computer network.

According to one or more embodiments of the disclosure, a node (e.g., root node) may determine a topology of a plurality of reporting nodes (e.g., sensors/meters) within a directed acyclic graph (DAG) in a computer network. The reporting nodes may then be assigned to one of a plurality of reporting groups, where reporting nodes are allowed to report only during designated time windows corresponding to their assigned reporting group. The reporting nodes may then be informed of at least their own assignment to a particular reporting group.

According to one or more additional embodiments of the disclosure, a particular reporting node may join the DAG, and may also receive an assignment to an assigned one of a plurality of reporting groups. Accordingly, the particular reporting node may also determine designated time windows corresponding to the assigned reporting group, where the particular reporting node is allowed to report only during the designated time windows. As such, the particular reporting node may report (e.g., transmit metered or sensed data) during at least one of the designated time windows.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, CPL G3, Watt Pulse Communication (WPC), and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically wireless networks, though wired connections are also available. That is, in addition to one or more sensors, each sensor device (node) in a sensor network may generally be equipped with a radio transceiver or other communication port, a microcontroller, and an energy source, such as a battery. Generally, size and cost constraints on sensor nodes result in corresponding constraints on resources such as energy, memory, computational speed and bandwidth. Correspondingly, a reactive routing protocol may, though need not, be used in place of a proactive routing protocol for sensor networks.

In certain configurations, the sensors in a sensor network transmit their data, along with routing/relaying data from other sensors, to one or more centralized or distributed database management nodes that obtain the data for use with one or more associated applications. Alternatively (or in addition), certain sensor networks provide for mechanisms by which an interested subscriber (e.g., "sink") may specifically request data from devices in the network. In a "push mode," the sensors transmit their data to the sensor sink/subscriber without prompting, e.g., at a regular interval/frequency or in response to external triggers, such as alarm messages. Conversely, in a "pull mode," the sensor sink may specifically request that the sensors (e.g., specific sensors or all sensors) transmit their current data (or take a measurement, and transmit that result) to the sensor sink. (Those skilled in the art will appreciate the benefits and shortcomings of each mode, and both apply to the techniques described herein.)

FIG. 1 is a schematic block diagram of an example computer network 100 illustratively comprising nodes/devices 200 (e.g., labeled as shown, "Root," "11," "12," . . . "43," "44") interconnected by various methods of communication. For instance, the links 105 may be wired links or may comprise a wireless communication medium, where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, while the embodiments are shown herein with reference to a generally "tree" shaped network, the description herein is not so limited, and may be applied to networks that have branches emitting to all directions from with the root node generally centralized among a plurality of surrounding nodes Illustratively, certain devices in the network may be more capable than others, such as those devices having larger memories, sustainable non-battery power supplies, etc., versus those devices having minimal memory, battery power, etc. For instance certain devices 200 may have no or limited memory capability. Also, one or more of the devices 200 may be considered "root nodes/devices" (or root capable devices), also referred to as LLN border routers (LBRs), while one or more of the devices may also be considered "destination nodes/devices." Further, as generally described herein, nodes of the network 100, generally nodes other than the root node, may be configured to report data (information), such as sensors, meters, etc.

Data packets 140 (e.g., traffic and/or messages sent between the devices/nodes) may be exchanged among the nodes/devices of the computer network 100 using predefined network communication protocols such as the Transmission Control Protocol/Internet Protocol (TCP/IP), User Datagram Protocol (UDP), Multi-Protocol Label Switching (MPLS), various proprietary protocols, etc. In this context, a protocol consists of a set of rules defining how the nodes interact with each other. In addition, packets within the network 100 may be transmitted in a different manner depending upon device capabilities, such as source routed packets.

Figure 2:
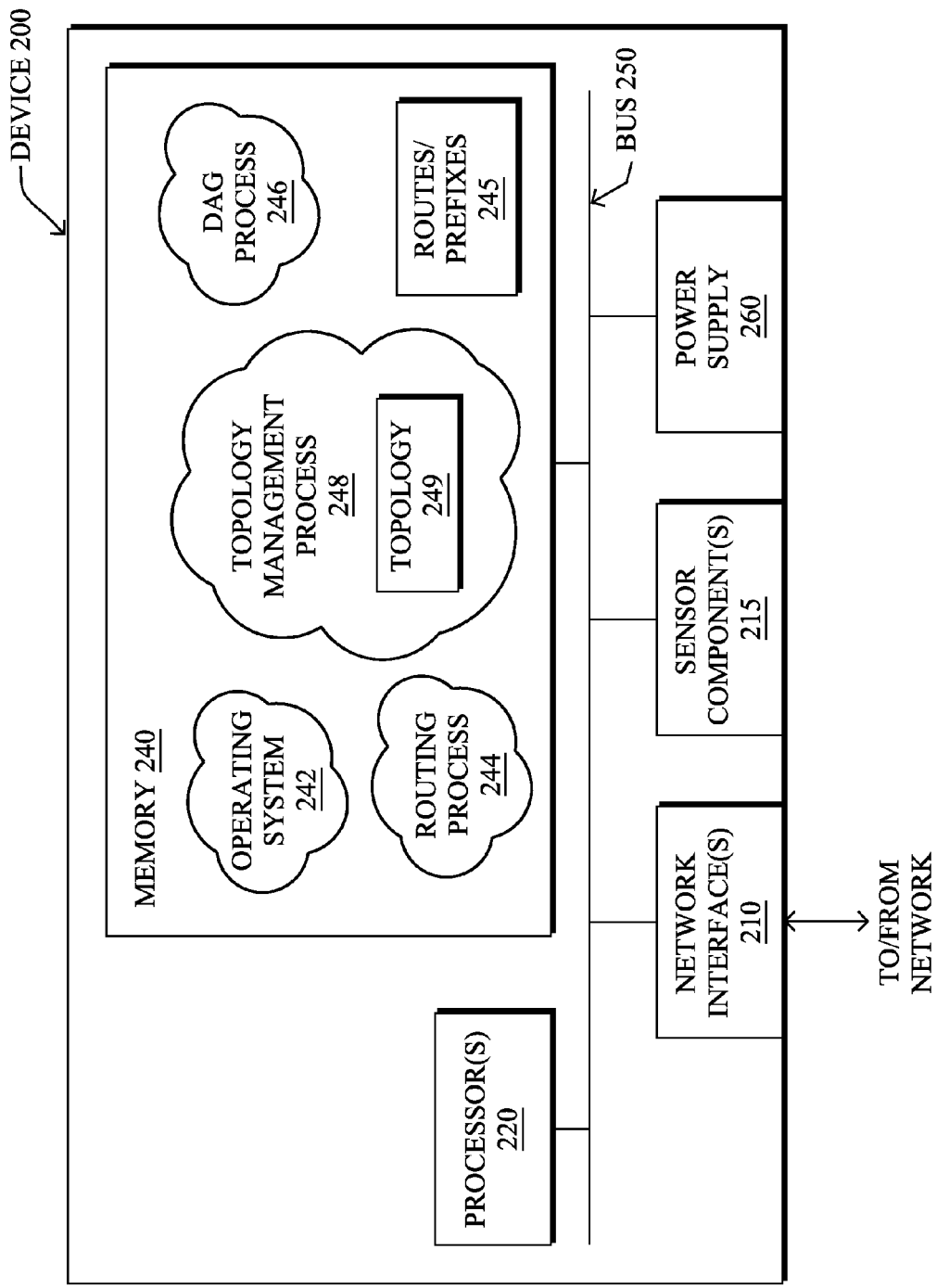
FIG. 2 illustrates an example network device/node.

FIG. 2 is a schematic block diagram of an example node/device 200 that may be used with one or more embodiments described herein, e.g., as a root node or other node (e.g., sensor, meter, etc.) in the network. The device may comprise one or more network interfaces 210, one or more sensor components 215 (e.g., sensors, actuators, etc.), at least one processor 220 (e.g., an 8-64 bit microcontroller), and a memory 240 interconnected by a system bus 250, as well as a power supply 260 (e.g., battery, plug-in, etc.). Notably, a root node need not contain a sensor component 215.

The network interface(s) 210 contain the mechanical, electrical, and signaling circuitry for communicating data over physical and/or wireless links coupled to the network 100. The network interfaces may be configured to transmit and/or receive data using a variety of different communication protocols, including, inter alia, TCP/IP, UDP, wireless protocols (e.g., IEEE Std. 802.15.4, WiFi, Bluetooth®), Ethernet, powerline communication (PLC) protocols, etc. Note that the root may have two different types of network connections 210. Namely, one or more interfaces may be used to communicate with the mesh network (into the mesh cell), i.e., the other nodes shown in FIG. 1, while for the root node, another interface may be used as a WAN uplink network interface between the root node and, for example, a head-end device located through the WAN.

The memory 240 comprises a plurality of storage locations that are addressable by the processor 220 and the network interfaces 210 for storing software programs and data structures associated with the embodiments described herein. As noted above, certain devices may have limited memory or no memory (e.g., no memory for storage other than for programs/processes operating on the device). The processor 220 may comprise necessary elements or logic adapted to execute the software programs and manipulate the data structures, such as routes or prefixes 245 (notably on capable devices only). An operating system 242, portions of which are typically resident in memory 240 and executed by the processor, functionally organizes the device by, inter alia, invoking operations in support of software processes and/or services executing on the device. These software processes and/or services may comprise routing process/services 244, which may include an illustrative directed acyclic graph (DAG) process 246. Also, for root devices (or other management devices), a topology management process 248 and associated stored topologies 249 may also be present in memory 240, for use as described herein. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). For example, reporting nodes, as described herein, may comprise an illustrative "reporting module," configured to generate report information, functionally similar to sensor component 215 in combination with processor 220.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table 245 containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks"<draft-ietf-roll-rpl-15> by Winter, at al. (Nov. 11, 2010 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc.

A DAG is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, estimated transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks"<draft-ietf-roll-routing-metrics-12> by Vasseur, et al. (Nov. 10, 2010 version). Further, an example OF (e.g., a default OF) may be found in an IETF Internet Draft, entitled "RPL Objective Function 0"<draft-ietf-roll-of0-03> by Thubert (Jul. 29, 2010 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state.

Figure 3:
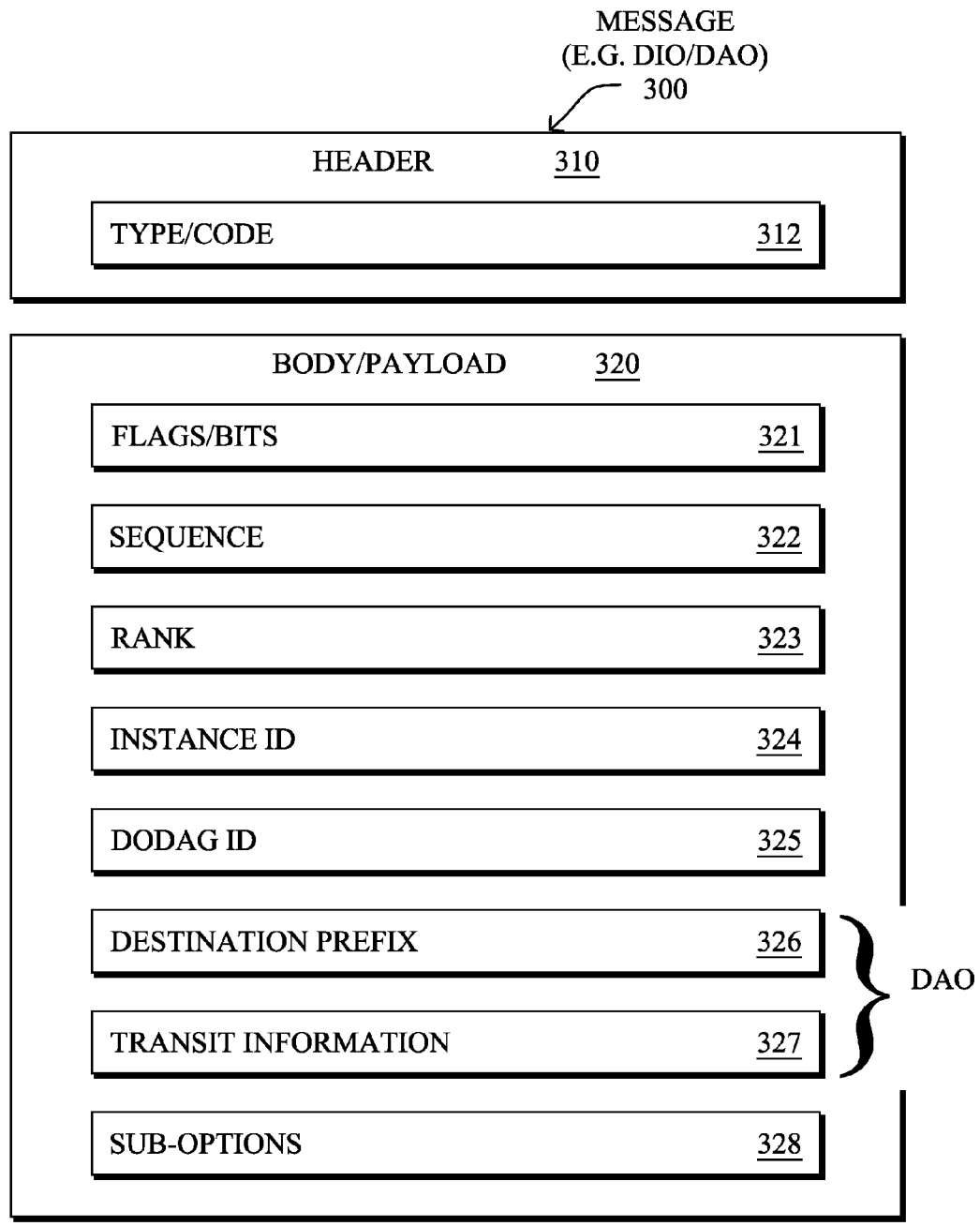
FIG. 3 illustrates an example message.

FIG. 3 illustrates an example simplified control message format 300 that may be used for discovery and route dissemination when building a DAG, e.g., as a DIO or DAO. Message 300 illustratively comprises a header 310 with one or more fields 312 that identify the type of message (e.g., a RPL control message), and a specific code indicating the specific type of message, e.g., a DIO or a DAO (or a DAG Information Solicitation). Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For either DIOs or DAOs, one or more additional sub-option fields 328 may be used to provide additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, lists, etc., as may be described herein, e.g., in one or more type-length-value (TLV) fields.

Figure 4:
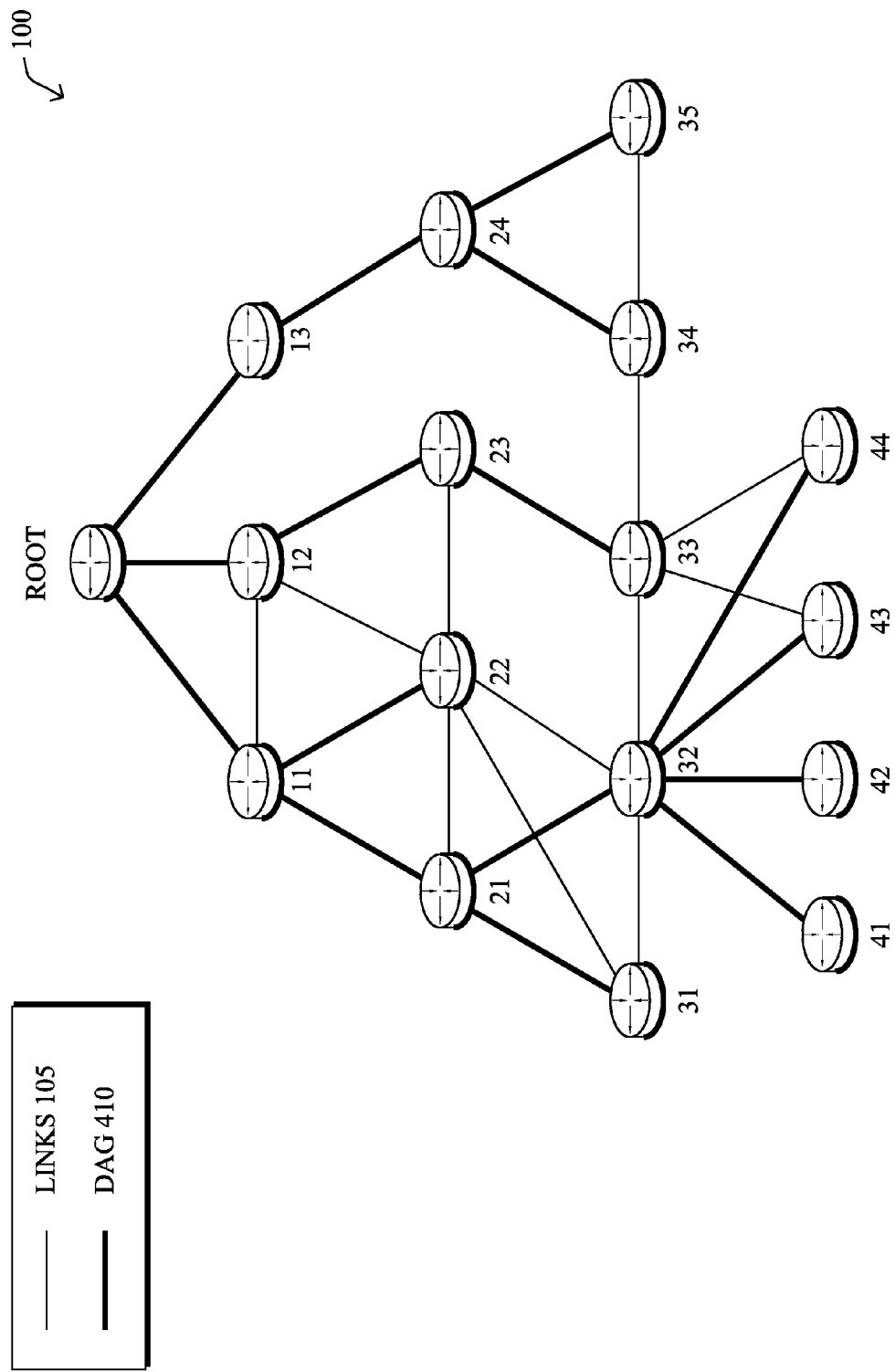
FIG. 4 illustrates an example directed acyclic graph (DAG) in the computer network of FIG. 1.

FIG. 4 illustrates an example DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as thicker lines), which extends from the root node toward one or more leaf nodes (nodes without children). Traffic/packets 140 (shown in FIG. 1) may then traverse the DAG 410 in either the upward direction toward the root or downward toward the leaf nodes.

As noted above, certain LLNs, such as advanced metering infrastructure (AMI) systems used to collect meter readings, can be very large in scale. For example, a single collector/access point can serve thousands of meters while an AMI system with multiple collectors may service millions of meters. In addition, in a mesh field area network (FAN), congestion of packets carrying data (reporting/metered data) can be a significant issue, where data packets from/to a given meter may have to contend with multiple (at times hundreds) of packets from other meters over each radio mesh link. It is common for mesh networks to have some nodes located multiple (e.g., up to 32) hops away from the root and therefore packets may need to traverse many links/hops in a wireless mesh.

Though reporting data may be generated (sensed/metered) at a frequent interval (e.g., every few minutes), to reduce congestion and provide a more scalable system, reporting data is currently stored at the originating reporting device, and transmitted at a less frequent interval (e.g., every eight hours). In particular, in existing AMI systems, meters send packets to the head-end/root node during random intervals to mitigate congestion and to facilitate greater scalability. This is typical in a large scale system which operates in accordance with a broadcast-request/report paradigm or when individual nodes are configured to send their data uplink periodically (e.g., every 8 hours). In these cases the explicit timing at which each node sends its data uplink is chosen randomly substantially without considering the specific FAN topology and substantially without any coordination with the transmission timing of its neighbors (including hidden neighbors). Note that this is true in other types of IP/MPLS networks too.

Additionally, other mesh networks also attempt to reduce packet collision by assigning first children with different timeslots and frequency sequences than those assigned to other nodes in the mesh (some form of path diversity thanks to frequency hopping). This system however does not mitigate collisions between packets sent by children of the same order (the same depth in the DAG).

Reporting Groups

The techniques herein introduce a novel data reporting (e.g., meter data collection) methodology that takes into account the topology of a mesh network. In particular, as described herein, the techniques increase the reliability of packet delivery and increase the overall network efficiency by decreasing the collision probability as well as the number of reporting data messages that a system can collect within a given period. While existing systems optimize the operations of mesh networks solely by allowing nodes to adaptively select the best parent, a system in accordance with the techniques herein augments the mesh network topology optimization by adaptively modifying the timing at which packet transmission from various reporting nodes is initiated through the use of "reporting groups".

Specifically, according to one or more embodiments of the disclosure, a node (e.g., root node) may determine a topology of a plurality of reporting nodes (e.g., sensors/meters) within a DAG 410, as shown in FIG. 4, in a computer network. The reporting nodes may then be assigned to one of a plurality of reporting groups, where reporting nodes are allowed to report only during designated time windows corresponding to their assigned reporting group. The reporting nodes may then be informed of at least their own assignment to a particular reporting group. Furthermore, according to one or more additional embodiments of the disclosure, a particular reporting node may join the DAG, and may also receive an assignment to an assigned one of a plurality of reporting groups. Accordingly, the particular reporting node may also determine designated time windows corresponding to the assigned reporting group, where the particular reporting node is allowed to report only during the designated time windows. As such, the particular reporting node may report (e.g., transmit metered or sensed data) during at least one of the designated time windows, particularly, only during its designated time window.

Illustratively, the techniques described herein may be performed by hardware, software, and/or firmware, such as in accordance with DAG process 246, which may contain computer executable instructions executed by the processor 220 to perform functions relating to the novel techniques described herein, e.g., in conjunction with routing process 244. For example, the techniques herein may be treated as extensions to conventional protocols, such as the RPL protocol, and as such, would be processed by similar components understood in the art that execute the RPL protocol, accordingly.

Operationally, the DAG root (or other DAG management node) first retrieves the DAG topology that describes the network connectivity between a plurality of reporting nodes (e.g., nodes 11-44), such as sensors, meters, etc., as mentioned above (e.g., FIG. 4). For example, this may be accomplished thanks to various techniques such as local topology collection reported to the DAG root via DAO messages 300. The information is then stored in the root node (or management node, collector, central entity, head-end node, etc.). This topology, which contains neighbor relationships, can be used in conjunction with a geographic information system (GIS) map to augment the optimization by taking into account the location information of nodes in the mesh.

In order to minimize traffic contention in the network 100, such as from collisions, interference, etc., the techniques herein may next attempt to create and/or organize the reporting timing of the nodes to reduce the occurrence of contentious transmissions within the network. For instance, using the DAG topology of the mesh network, the reporting nodes are divided into N reporting groups. Specifically, the root node (management node, etc.) dynamically assigns each of the reporting nodes to one of a plurality of reporting groups, where reporting nodes are allowed to report only during designated time windows corresponding to their assigned reporting group.

Notably, the number of reporting groups N, may be chosen by a network administrator and/or based dynamically in response to network conditions. For example, if the network 100 is relatively cooperative (i.e., few collisions, little interference, etc.) as determined by various network statistic monitoring techniques (e.g., monitoring packet loss, etc.), then the number N of reporting groups may be kept low or even decreased. Alternatively, at the other extreme where the reporting nodes are particularly contentious (i.e., many collisions, much interference, etc.), then the number of reporting groups may be increased.

Figure 5A:
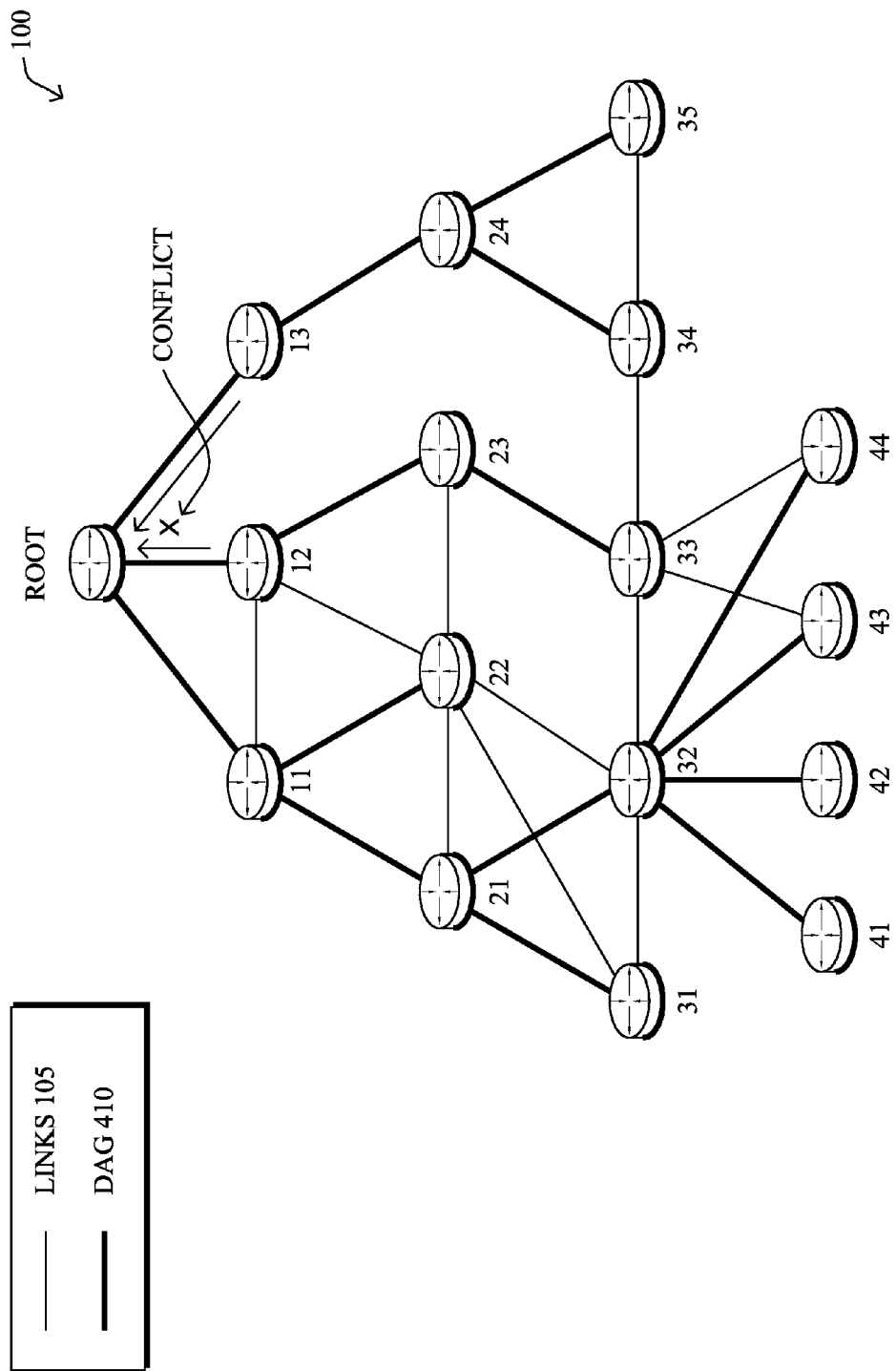
FIGS. 5A-B illustrate example conflicts to avoid.
Figure 5B:
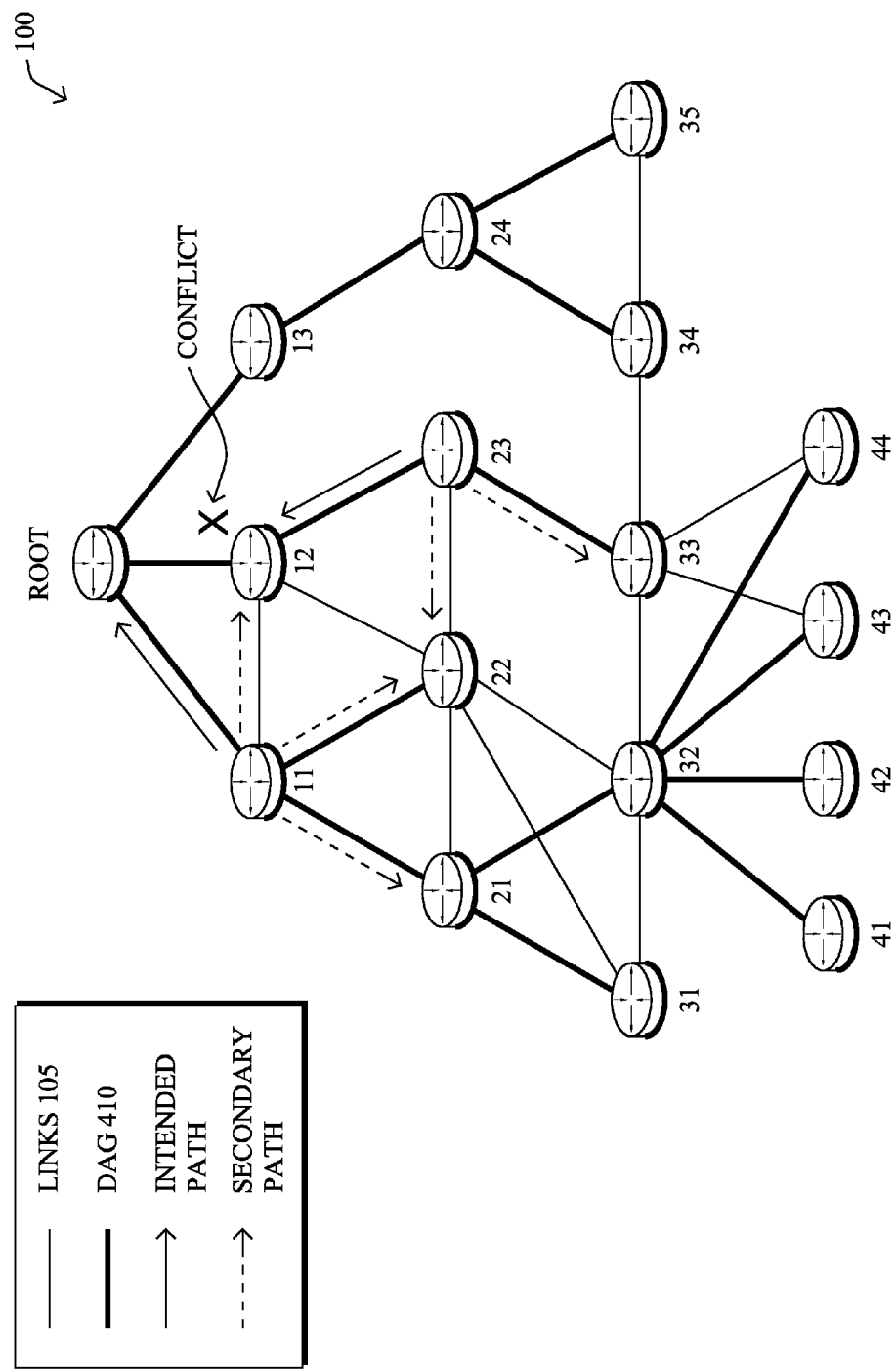

The process of assigning nodes to the various groups may be governed by, but are not limited to being governed by, the following considerations:

1.) Reporting nodes are grouped so that the traffic generated by the nodes in a given group will have the least (minimal) contention with each other when reporting. For instance, this measure can be determined by estimating the amount of contention these nodes would have as their packets propagate uplink toward the DAG root (e.g. collector, cell relay, FAN router, etc.). The number of potential collisions can be estimated based on the meter location, channel, power, and neighbor relationships collected at the DAG root (or at the head-end node). Moreover, any other metrics such as ETX may be used. An example of this is shown in FIG. 5A, illustrating the simple scenario where nodes 12 and 13 attempt to report simultaneously, resulting in a conflict (e.g., collision) at the root node. Note that more complex conflicts may occur, such as the slightly more complex scenario shown in FIG. 5B where nodes 11 and 23 both report at the same time as "hidden neighbors." For instance, though each node has an intended path (solid arrow) along the DAG 410, in certain networks there is a secondary path (dashed arrow) created by the geographic propagation of signals (e.g., wireless signals) to any nodes within the vicinity of the transmitting device. For example, as shown, if node 11 and 23 transmit at the same time, though node 23's transmission is intended for node 12 along the DAG, node 23's transmission may be corrupted by node 11's secondary transmission path.

2.) Nodes in adjacent reporting groups (e.g., Group "i", "i−1", and "i+1"), specifically, groups adjacent in terms of timing windows, are also generally chosen to minimize contention/collision/interference. In other words, reporting nodes may be assigned to a particular group such that there is minimal contention with reporting nodes within adjacent reporting groups in addition to other reporting nodes within the particular reporting group.

3.) Uplink propagation path diversity are preferably maximized between reporting nodes of a particular reporting group.

Using these considerations, the root node (or other management node) may assess neighbor relationships within the network and may create reporting groups in order to avoid any conflict/overlap in transmissions taking into account the DAG topology. In particular, the reporting groups attempt to not only prevent collisions from direct neighbors (e.g., reporting nodes 34 and 35), but also hidden neighbors (e.g., nodes 11 and 13).

Notably, as an additional consideration, in one or more embodiments, reporting nodes with greater numbers of neighbors may be assigned to reporting groups prior to assigning reporting nodes with lesser numbers of neighbors (e.g., assigning node 32 with four children 41-44, and four other neighbors/parents 21, 22, 31, and 33, prior to assigning node 35, with only two neighbors 24 and 34). In this instance, if there are more nodes than time slots, or, more particularly, not enough reporting groups to avoid all conflicts, it is beneficial to control locations in the network with higher potential for occurrences of collisions.

Figure 6A:
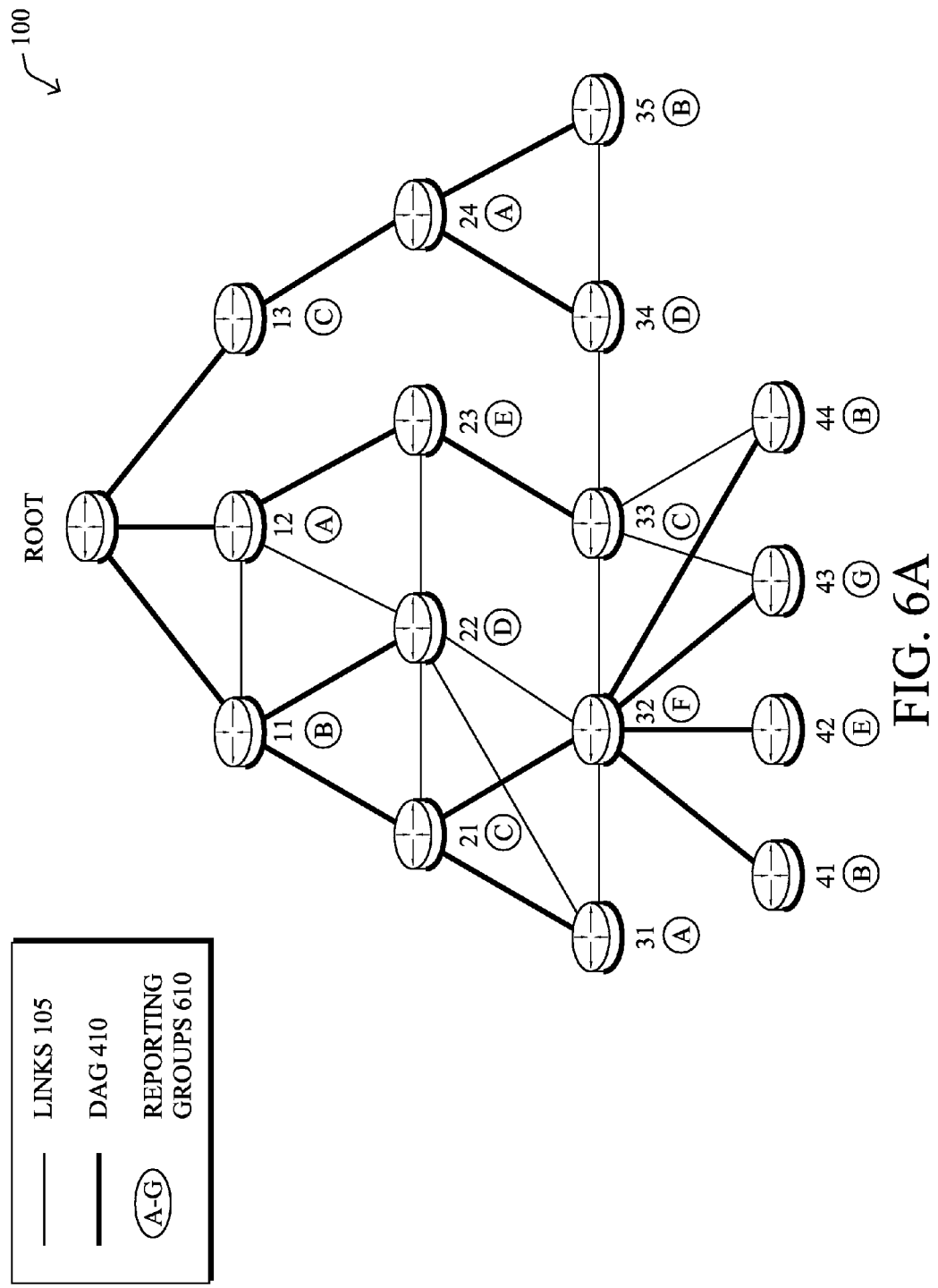
FIGS. 6A-B illustrate example assignment of reporting groups and timing windows.

Once the groups are established, the root node may then inform the reporting nodes of at least their own assignment to a particular reporting group (and the corresponding reporting schedule for the specific reporting group, as mentioned below), such as in a unicast message (e.g., packet 140) to each node specifying which reporting group that reporting node has been assigned. FIG. 6A illustrates an example assignment of reporting groups 610 in accordance with one or more embodiments herein. For instance, in the example assignment, four groups, Groups A-G, have been assigned as shown. As can be seen in the first order (depth in DAG), and as will be explained in more detail below, nodes 11, 12, and 13 are assigned to Groups B, A, and C, respectively, such that their reporting does not conflict at the root node (e.g., as it would have in FIG. 5A). Further, as can be seen in the second order, nodes 21-24 have also been assigned to different groups to avoid conflict, such as at node 11 from direct neighbor nodes 21 or 22, as well as at the root node from all first order nodes, particularly hidden nodes (e.g., as it would have in FIG. 5B).

Illustratively, node 23 has been assigned to reporting group E, since, for example, by assigning it to group B, node 23 may collide with node 11 at node 12. As a further example, node 31 cannot transmit in group D, since it may collide with node 22 during node 31's transmitting to its parent node 21. Hence, node 31 may be assigned to group A. Similar logic may be applied to the remaining nodes as described herein, so long as there are enough diverse reporting groups to fit the criteria. In the example (and as dealt with below), nodes 41 and 44 are both assigned to group B, which would collide at node 32. As described below, however, since these nodes are leaf nodes within the DAG, they may generally be considered to have very low traffic, and as such occasional collisions may be allowed to occur on such low traffic links.

Note that reporting nodes may change parents, thus creating a topology change to the DAG 410. In this instance, the new topology may remain with the previous reporting group assignments (that is, the node changing parents maintains its previous group assignment), or else the root node may re-assign that reporting node, or other nodes, to a different set of reporting groups. Furthermore, in one or more embodiments, a hybrid approach may be used, where for certain minimal changes may maintain their group assignments, while significant changes (e.g., a significant number of changes, a significant amount of traffic redistributed, etc.), may cause the root to establish new groups, accordingly. Also, the management node (e.g., head-end node or DAG root) may dynamically re-allocate the reporting group membership in response to topology changes, or in response to other factors, such as determining problems with a current assignment, etc.

According to the embodiments herein, the head-end node or the DAG root notifies each reporting node of its assigned reporting group's designated time windows, that is, the only times during which nodes of the group may report. (Note that while the embodiments herein generally describe only allowing reporting during the time windows, other messages, such as alarms, emergencies, high priority messages, etc., may be transmitted at any time in certain embodiments.) These time windows may be included within the unicast messages, or, alternatively, may be broadcast within the computer network as a general message corresponding to one or more (e.g., all) of the reporting group's time windows.

Note that this broadcast message can be sent relatively infrequently, since this information should not change often once the system has stabilized. That is, adjustments may be made to the designated time windows for one or more reporting groups during network operation (after an initial setting), in certain embodiments. For example, the adjustments may be made based on various network statistics, such as an amount of conflict (collisions, lost packets, etc.), which may be caused by, for example, too many nodes within a reporting group. In this instance, rather than reconfigure the reporting groups themselves, the root node may increase the time window for that particular high-conflict group, to allow more distribution of the transmissions within the window (e.g., FIG. 8, described below).

Figure 6B:
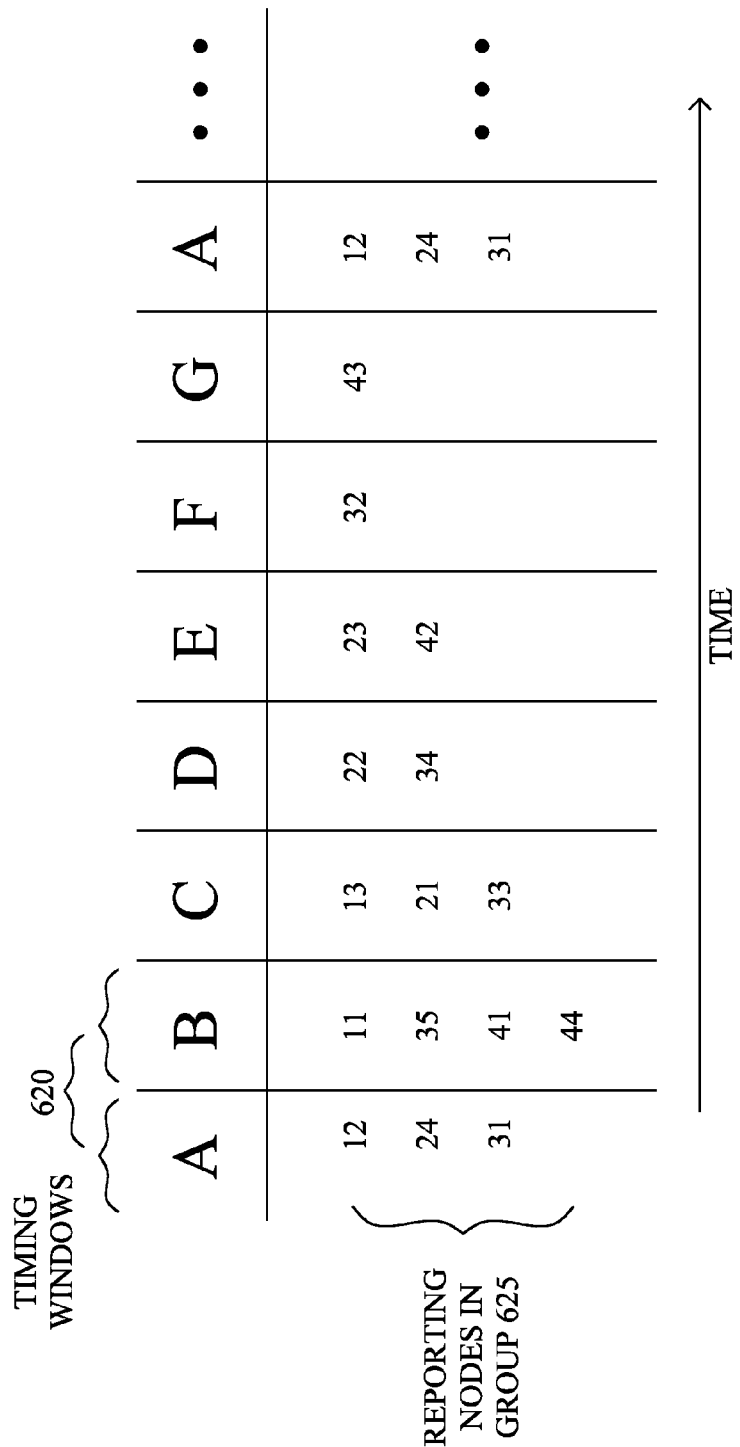

FIG. 6B illustrates an example of timing windows 620 for each group (Groups A-G). For instance, the windows may progress from Group A, to B, to C, to D, to E, to F, to G, to A, to B, etc. The length of each window 620 may be determined based on the number of nodes within the groups (node listing 625), the frequency at which reporting information is desired (e.g., four times a day), administrator configuration, etc. The lengths of the windows 620 may, though need not be, the same. However, nodes within the groups must know at least when their respective time window is with respect to the other windows. Note that as shown in FIG. 6B, the lists of nodes 625 is shown in order/depth of the DAG, though this is merely illustrative, as each node within a group may report at any time generally independently of the other nodes within the group.

Reporting nodes that have joined the DAG eventually receive their assignment to an assigned one of the plurality of reporting groups 610 as noted above, and may also determine their designated time windows 620 corresponding to the assigned reporting group. (Note that in certain embodiments, the reporting nodes in the mesh may advertise their assigned reporting group numbers (identification) in their neighbor discovery messages ("DIS" messages) sent out to determine reachability information for DAG construction.) When a reporting node has information to report, such as sensed data, meter information, etc., then the node waits for its designated time windows to report this data. In one or more alternative embodiments, the reporting nodes may be further configured to collect (sense, meter, etc.) the information at times based on the designated time windows for reporting. For instance, the reporting nodes may activate sensing/metering during a time period previous to the reporting window 620 (e.g., node 11 sensing in window A) and then may transmit this information in its corresponding designated window (e.g., node 11 reporting in window B). Moreover, in other windows, the reporting node may be configured to enter an energy conservation mode, such as by only listening and not sensing or reporting.

Figure 7A:
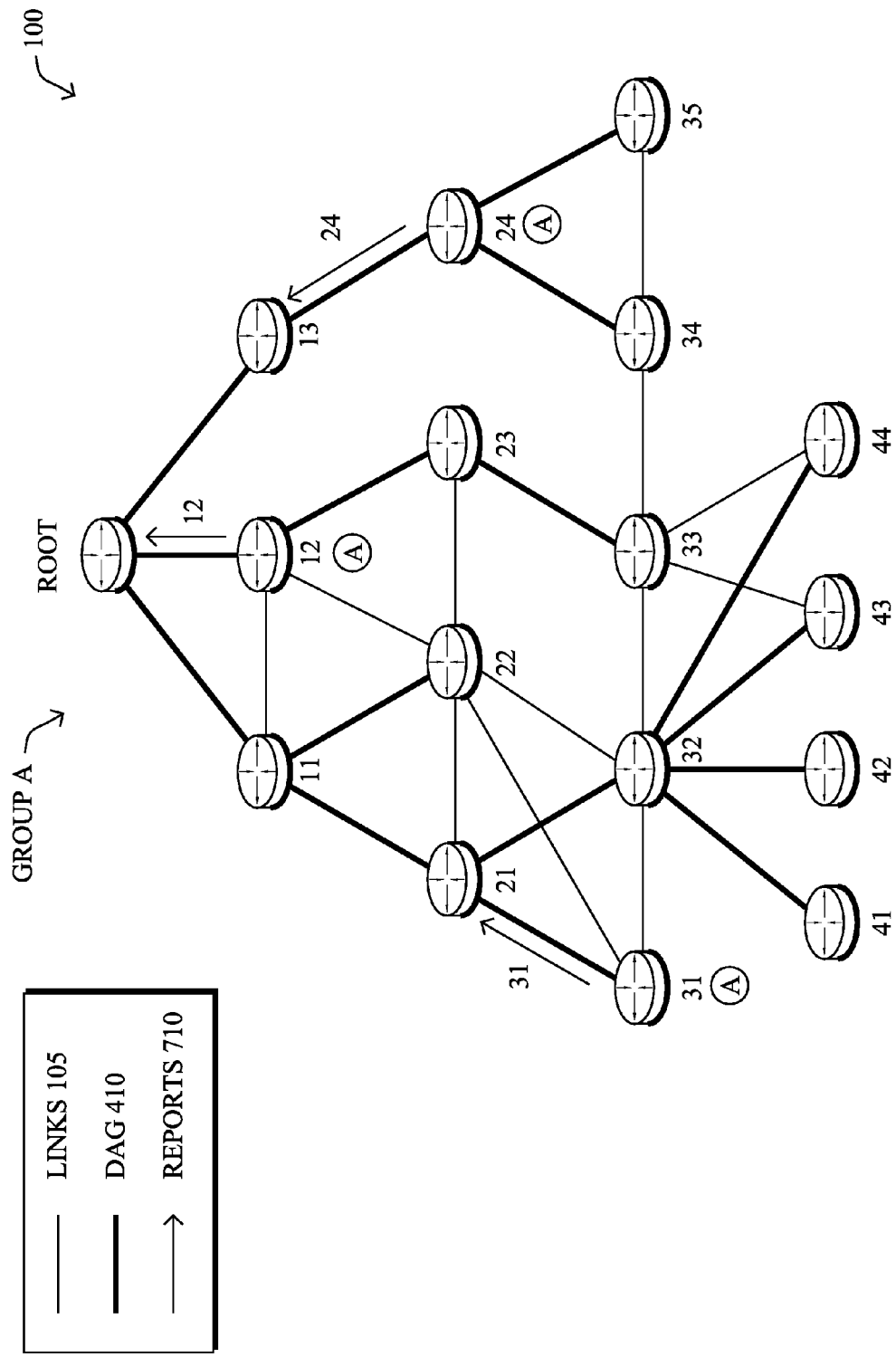
FIGS. 7A-8C illustrate examples of reporting timing.

Reporting nodes may send their reports (e.g., metering data) in the allocated window 620 specified by the reporting schedule in FIG. 6B based on the reporting group 610 to which they belong. FIGS. 7A-8C illustrate progressive reporting from the reporting nodes of particular reporting groups, e.g., Groups A-G, respectively. For example, as shown in FIG. 7A, nodes 12, 24, and 31 may send their reports 710 toward the root/collector node during their shared time window. Forwarding nodes (intermediate nodes) are then configured to store these reports/messages, and forward them at a later time during that particular forwarding node's own reporting window (i.e., a "store and forward" technique). That is, in response to receiving a packet during a time window that is not the designated transmission time window for the receiving reporting node, that node may store the packet and transmit it during its own designated transmission time window. This may delay the propagation of reports from deeper within the DAG, however it may avoid more conflicts based on shared/merging uplink paths.

Figure 7B:
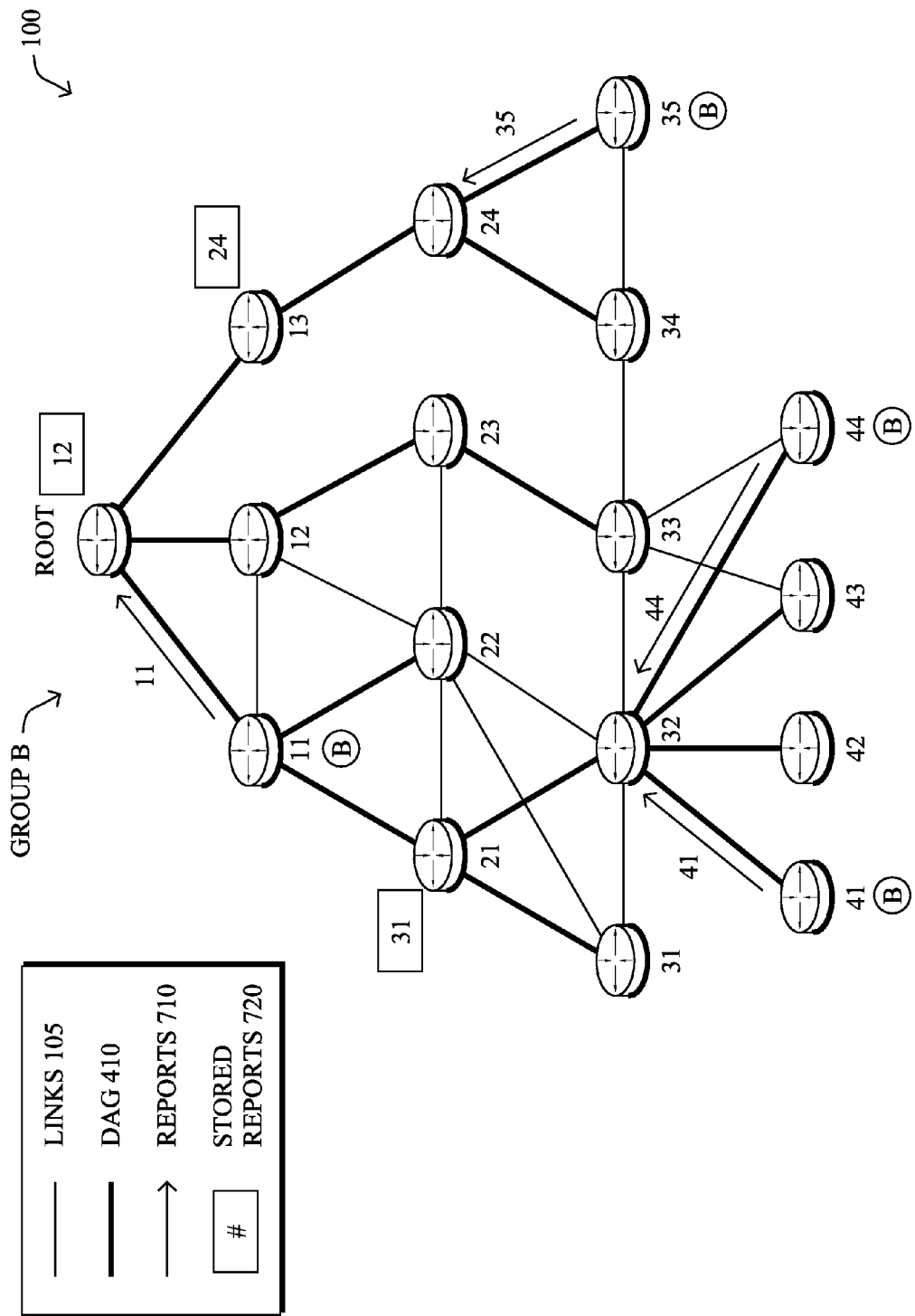
Figure 7C:
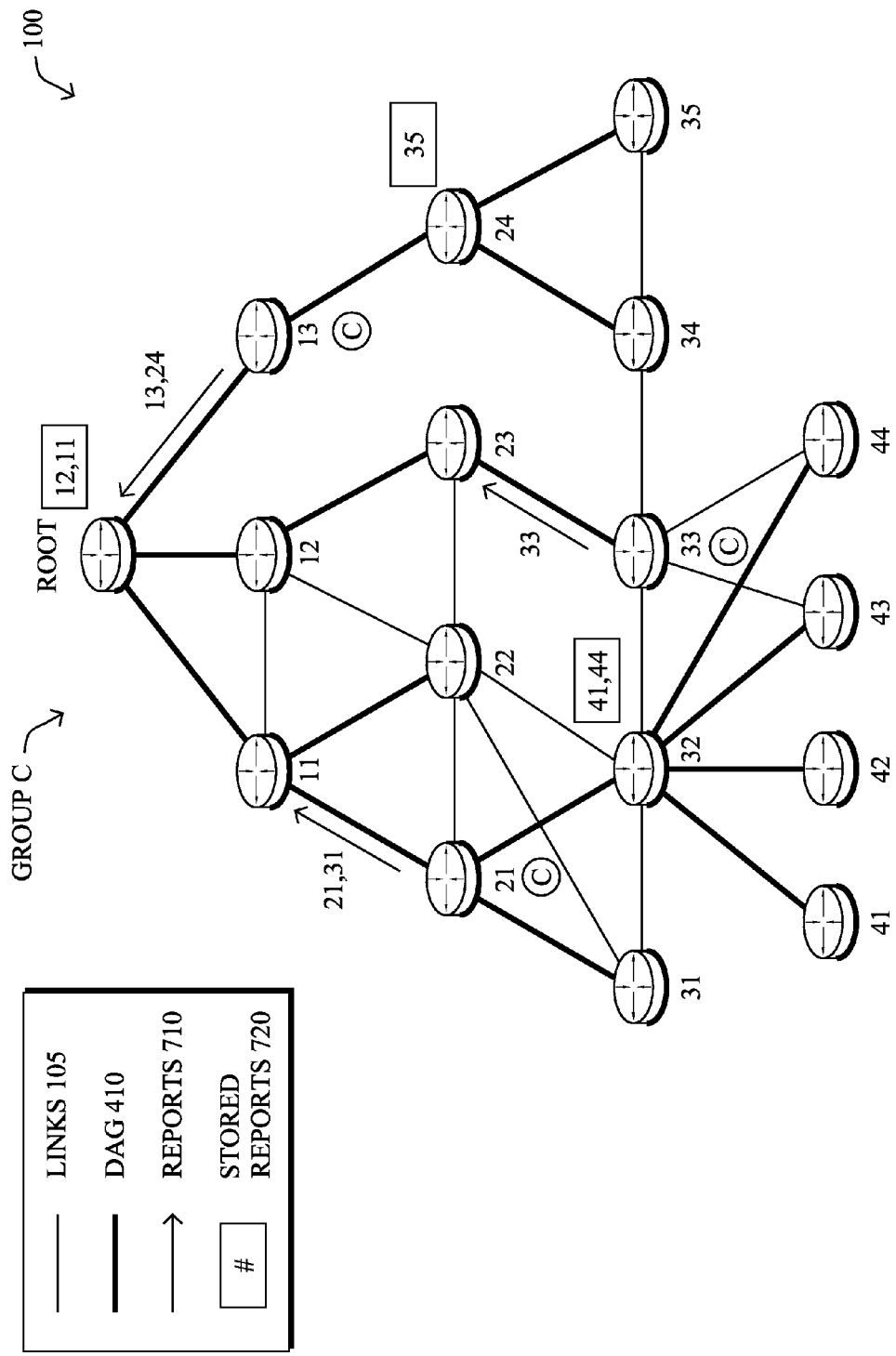
Figure 7D:
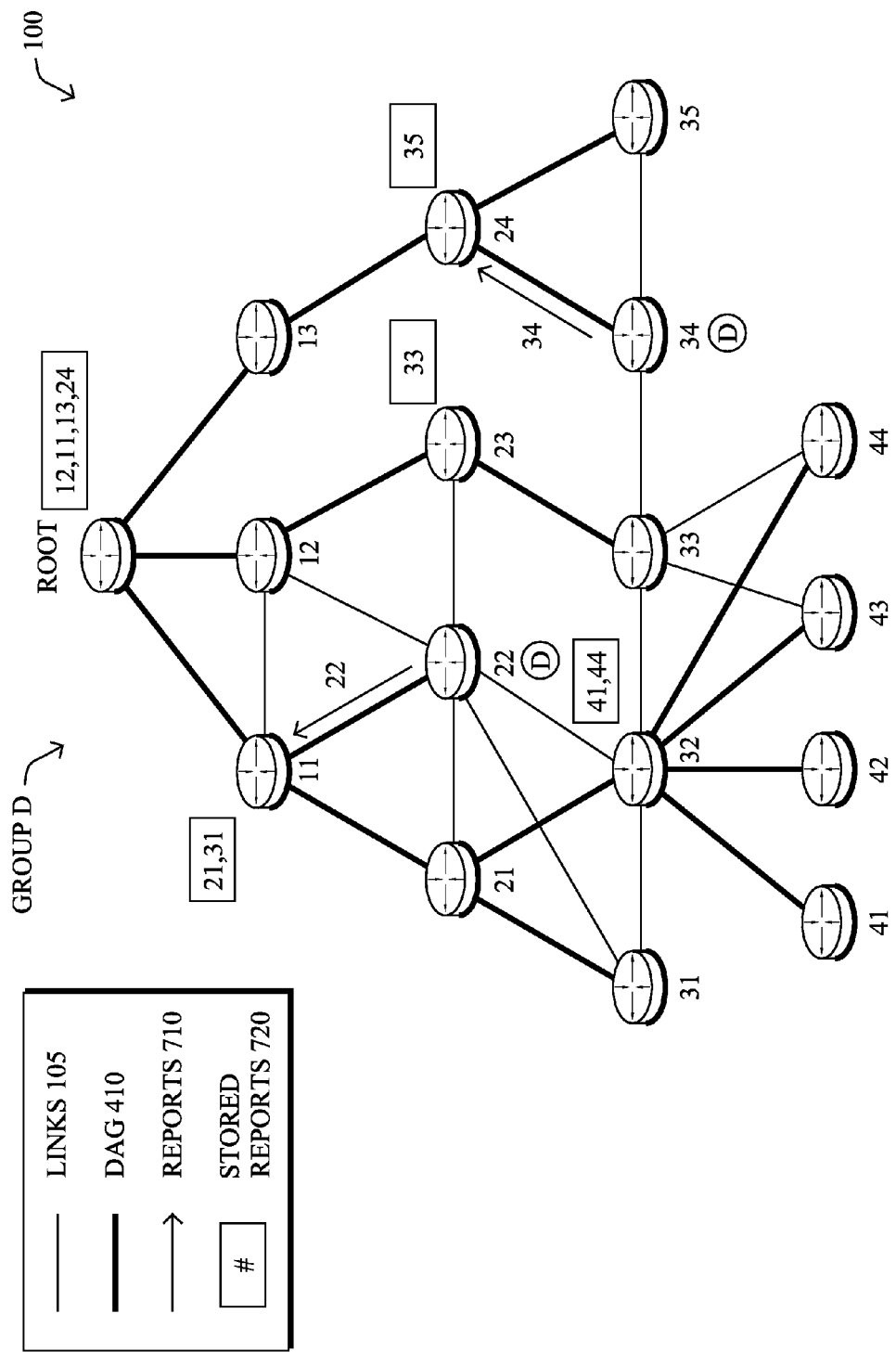
Figure 7E:
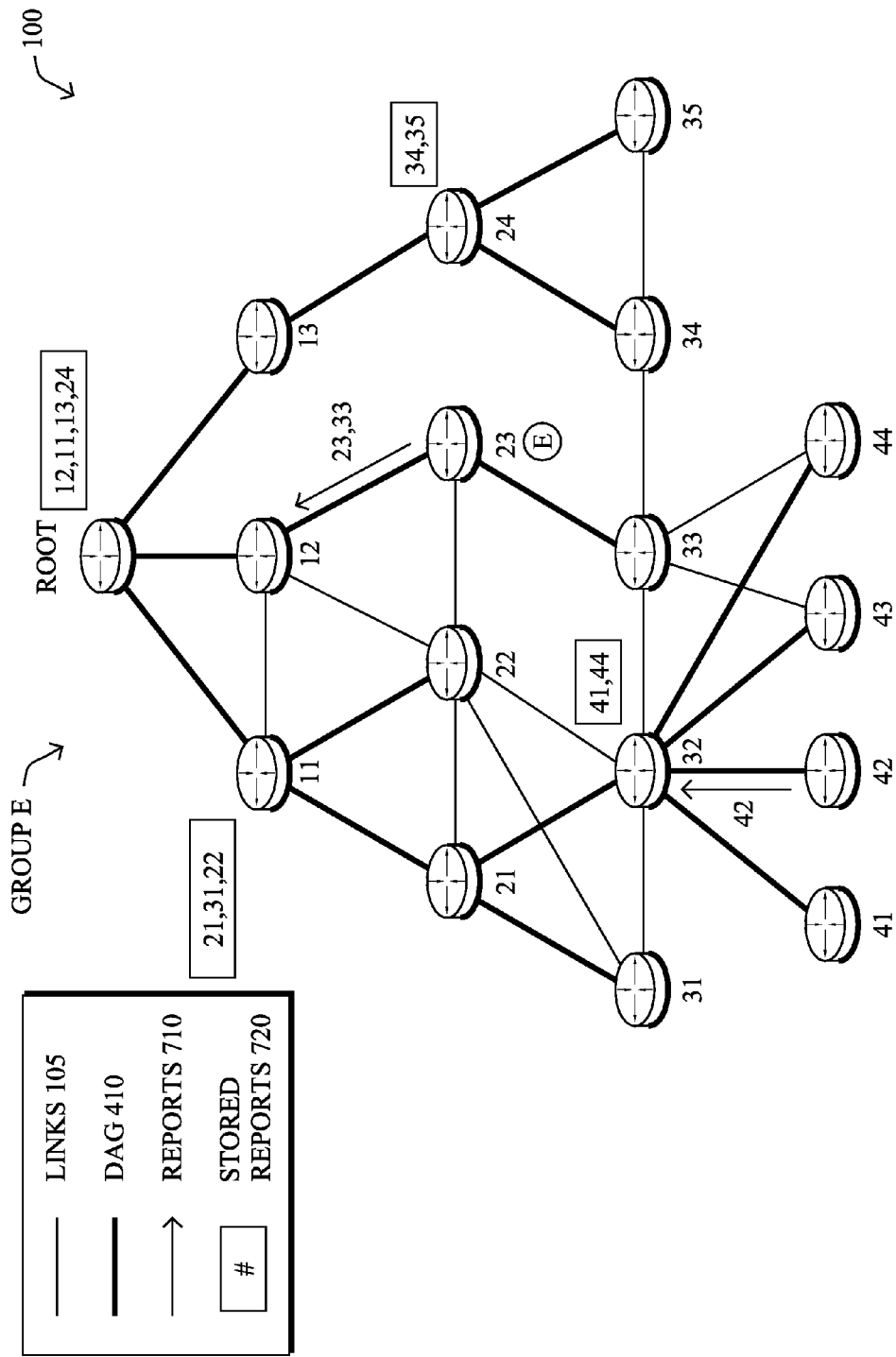
Figure 7F:
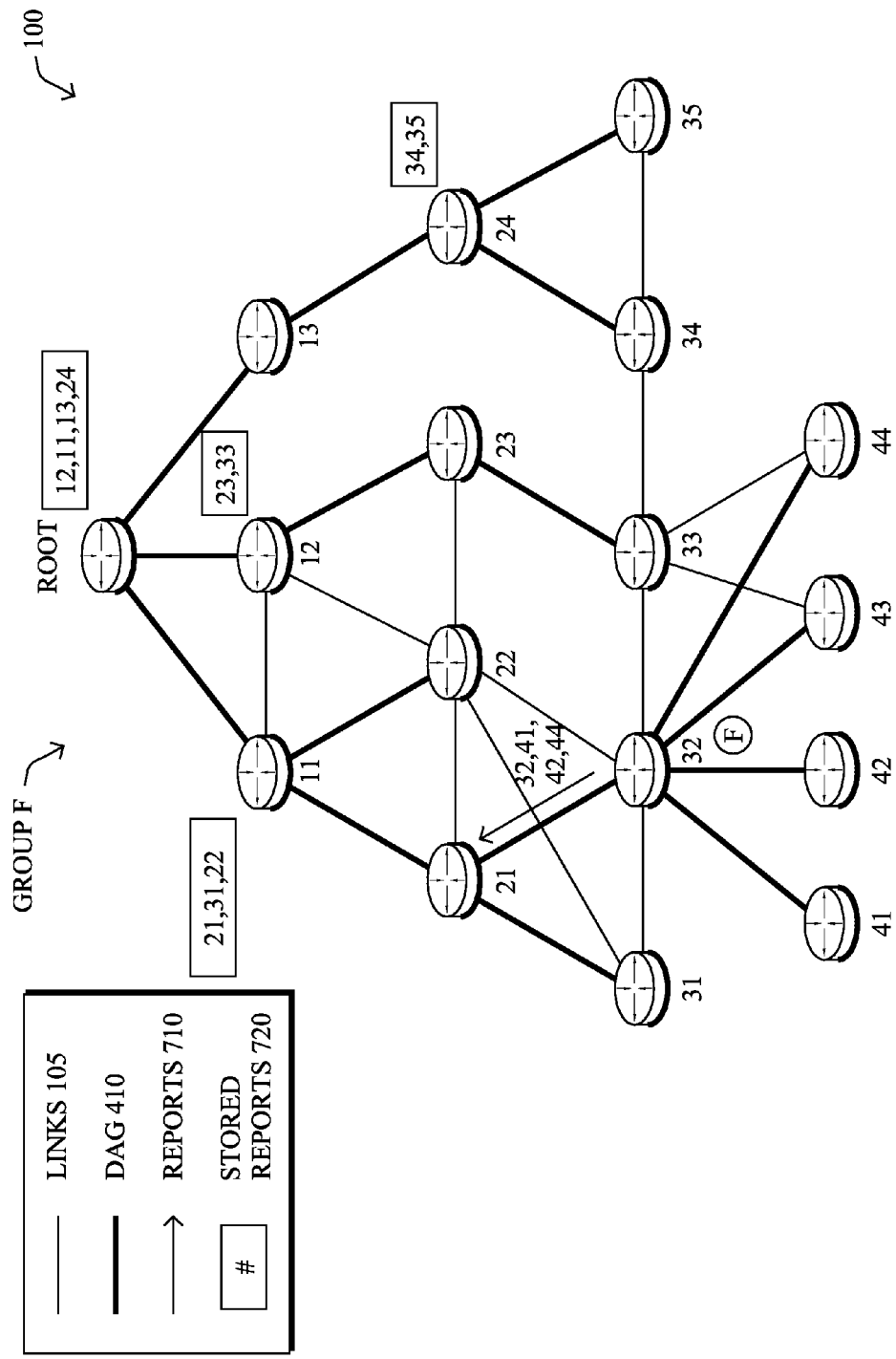

In particular, as shown in FIG. 7B (in progression from FIG. 7A), nodes receiving reports 710 in FIG. 7A from Group A have stored the reports 720 (e.g., in memory 240 or within a queue/cache in network interface 210, not explicitly shown). Also, nodes within Group B (nodes 11, 35, 41, and 44) are now given their chance to report their data (reports 710) during this timeslot. Once Group C's time window is reached in FIG. 7C, it can be seen that if a reporting node had previously received a report 710, such as node 13 (having received a report from node 24 during Group A's time window), then this reporting node 13 also includes the report from node 24 (indicated as "13,24") in its transmission. Note that the inclusion of node 24's report may be an aggregation of reports into a single report 710, or else each report may simply be forwarded separately, merely storing the previous report from node 24, and waiting to transmit it until node 13's designated transmission window.

This process continues through FIGS. 7D-7G (for Groups D-G, respectively), where each node transmits its report 710 as well as any stored reports during the node's assigned transmission time window. Notably, In FIG. 7G, it can be seen that though time has passed through all of the Groups A-G, that the root node has still not collected reports from all of the nodes in the network. In particular, this is due to the delayed transmission, and the often times "out of order" relaying of the information up the DAG, such that it may take several passes of a timing sequence A-G in order for the information to reach the collecting node (e.g., root).

Figure 7G:
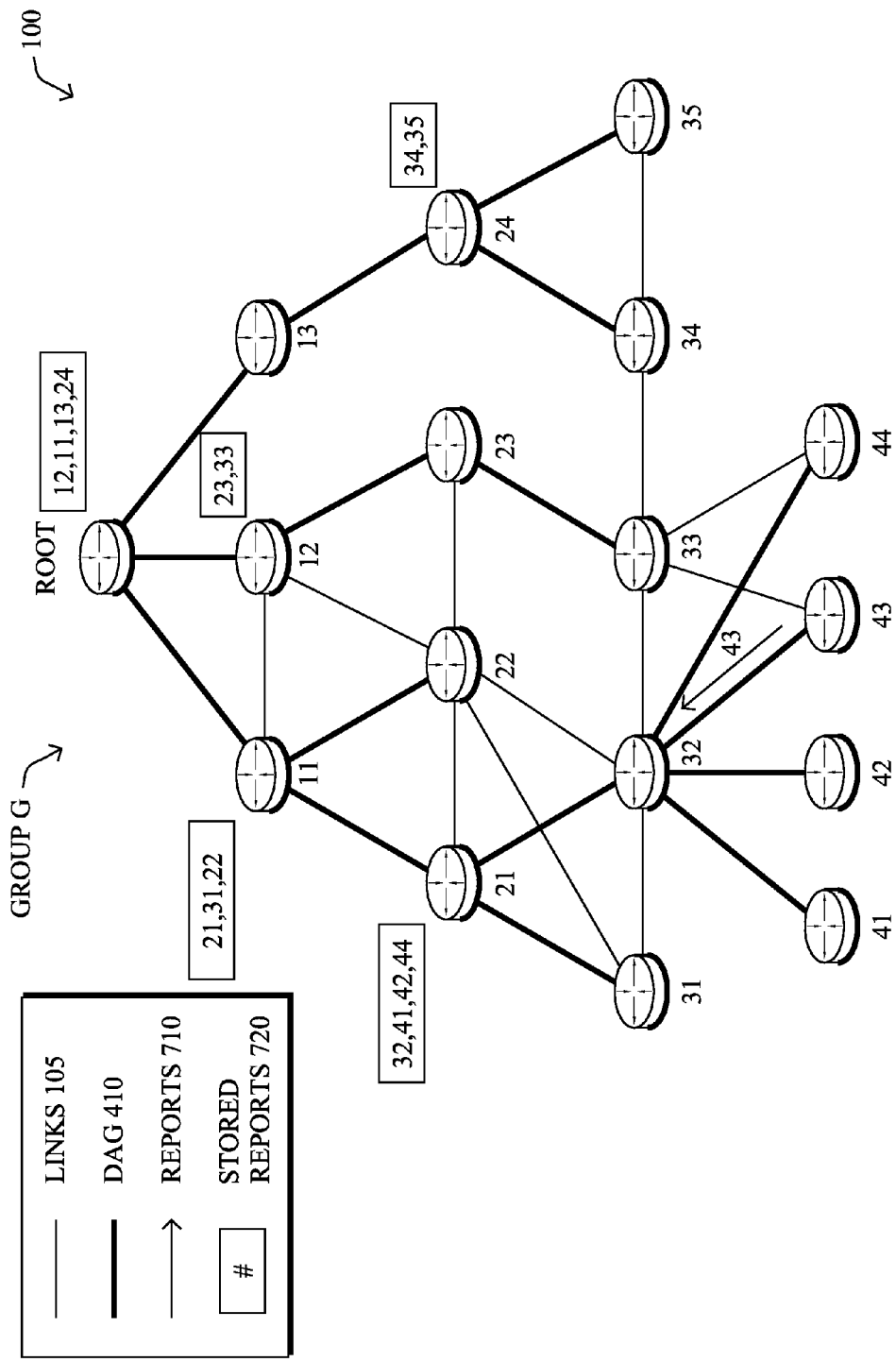
Figure 8A:
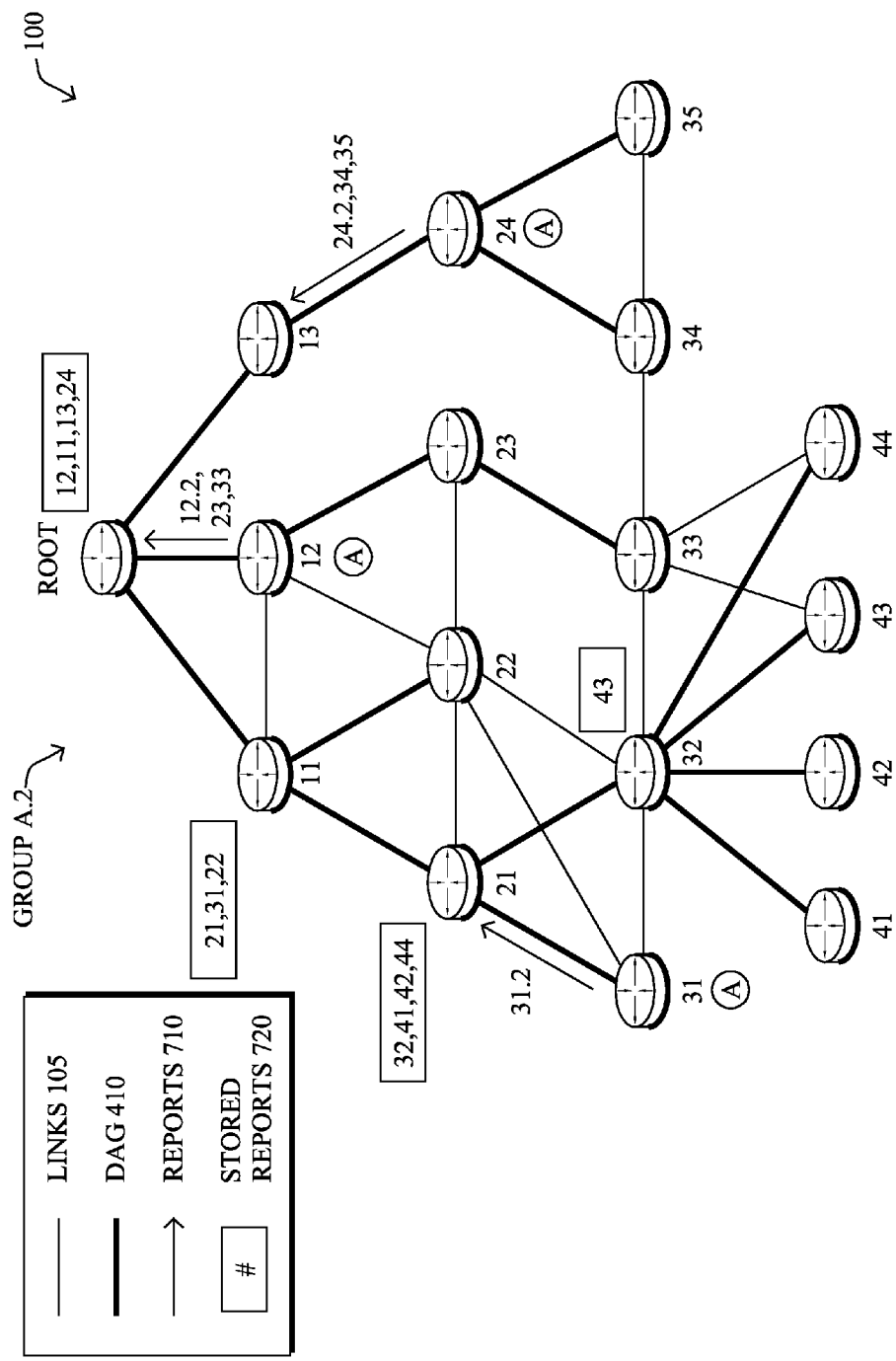
Figure 8B:
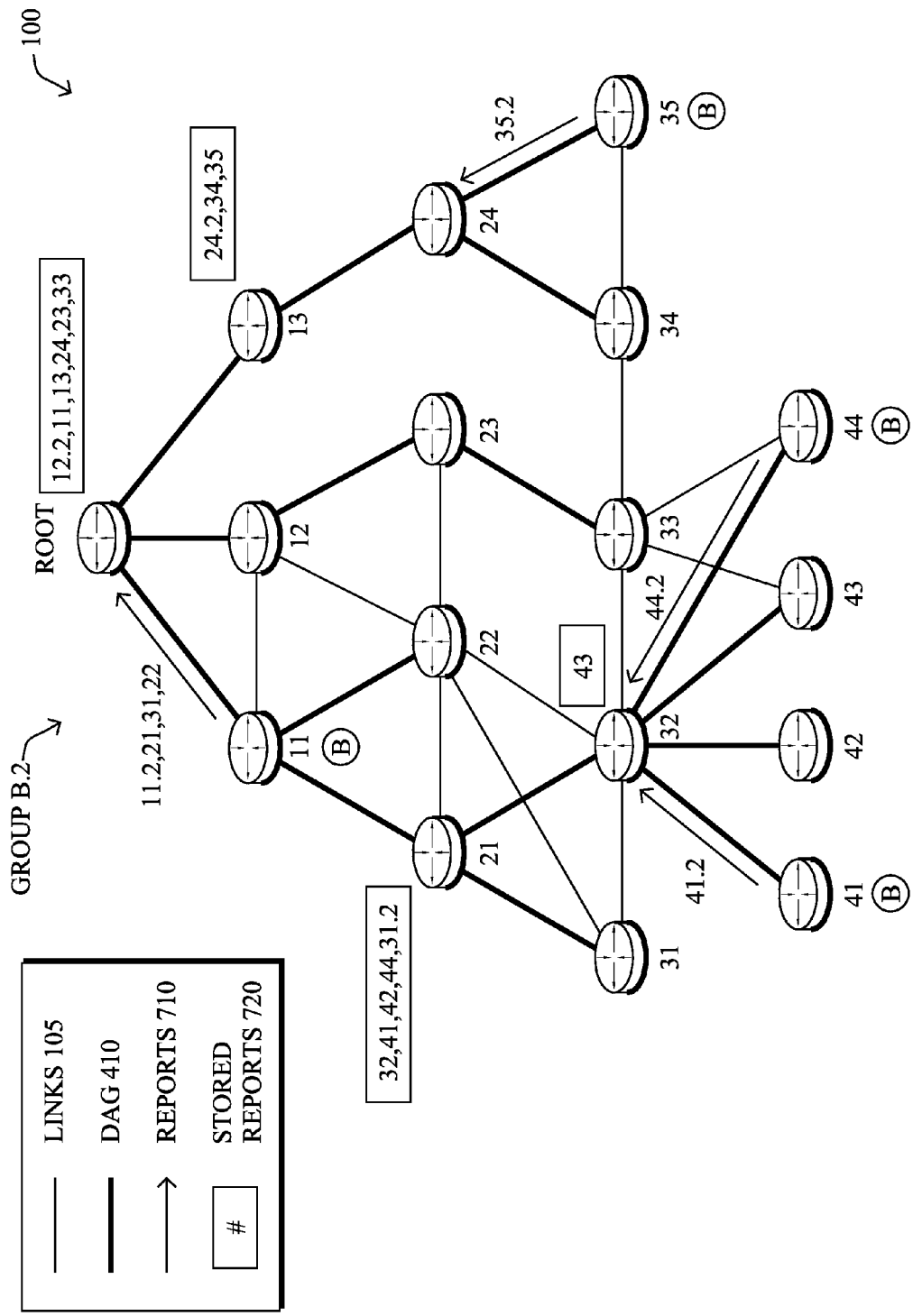
Figure 8C:
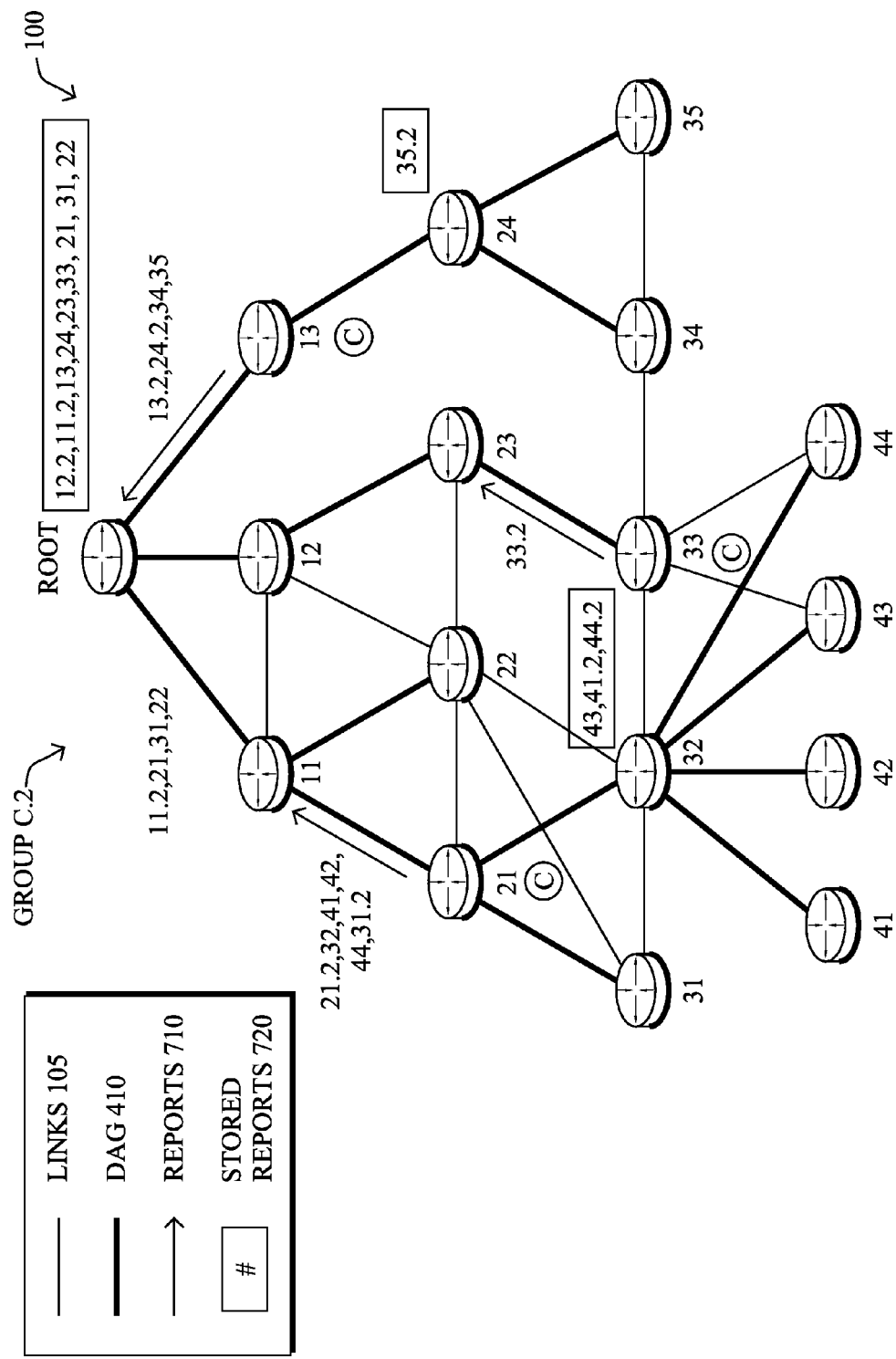

FIGS. 8A-C illustrate a second pass of the timing sequence continuing from FIG. 7G, such that FIG. 8A represents the second pass of Group A (denoted "Group A.2"). In this instance, it can be seen with particular reference to node 12's transmission, that node 12 now has stored reports from nodes 23 and 33. As such, node 12's reports 710 will contain a new report for node 12 (if one has been prepared), i.e., "12.2", and the stored reports for nodes 23 and 33. This continues through FIGS. 8B and 8C for Groups B.2 and C.2, respectively, and continues through further progression according to the time window sequence of the network (e.g., D.2, E.2, etc.). As can be seen in FIG. 8C, in particular, the root node has been receiving reports that may be slightly time-differentiated (e.g., "12.2", the second instance of node 12's report, and "22", the first instance of node 22's report, etc.). As noted above, this delay may be an acceptable tradeoff to congestion caused by not incorporating the reporting groups, and eventually, all reports from the reporting nodes in the network are received by the collector/root node.

Figure 9A:
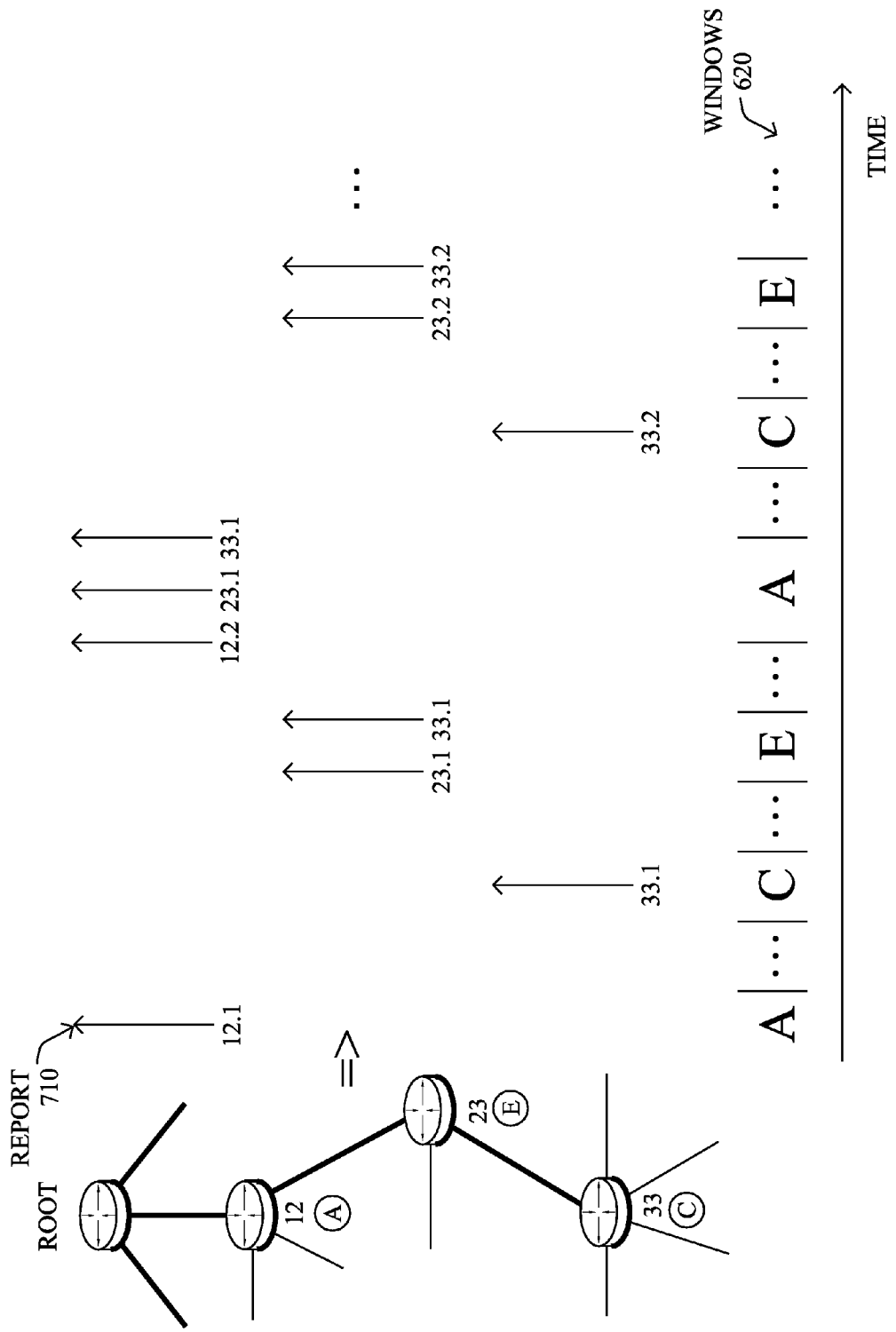
FIGS. 9A-B illustrate an alternative example of reporting timing.
Figure 9B:
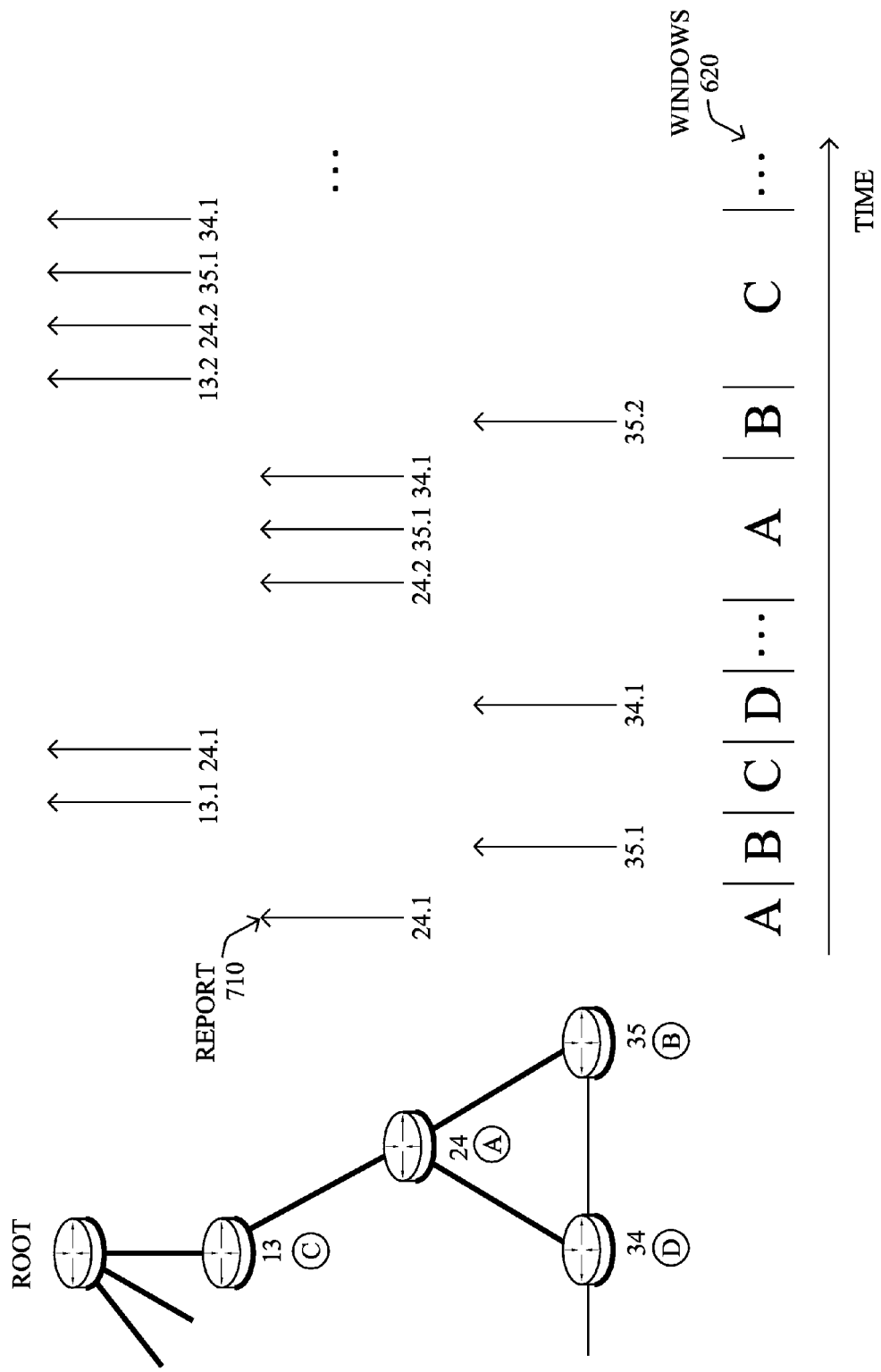

FIGS. 9A-B illustrate an alternative example of the reporting scheme. For instance, FIG. 9A illustrates the timing of the branch from reporting node 12, i.e., Root-12-23-33. As shown, based on the group assignments and timing windows of FIGS. 6A-B, node 12 (group A) starts its report "12.1" ("node.report-instance" for purposes herein). Next, node 33 reports "33.1", but node 23 is configured to hold this report until its next assigned window ("E"). Once time window "E" is reached, node 23 may now report "23.1", as well as the previously received report 33.1. Node 12 is configured to hold these reports until its next assigned window ("A"). During the next pass, node 12 in window A may now report a new "12.2" along with the received "23.1" and 33.1, etc. (Note that while the arrows indicate reports 710, where multiple reports 710 are sent from a single node during a time window, these reports may be separate reports, or may be combined into a single report.) As can be seen in progression, the reports to the root node are delayed based on the order of depth into the DAG (e.g., "12.*a*", "23.*a*-1", and "33.*a*-1") and the DAG topology to avoid collision of reporting data from nodes that would have likely collided. FIG. 9B illustrates an alternate branch/path, Root-13-24-34/35, and its progression.

Figure 10:
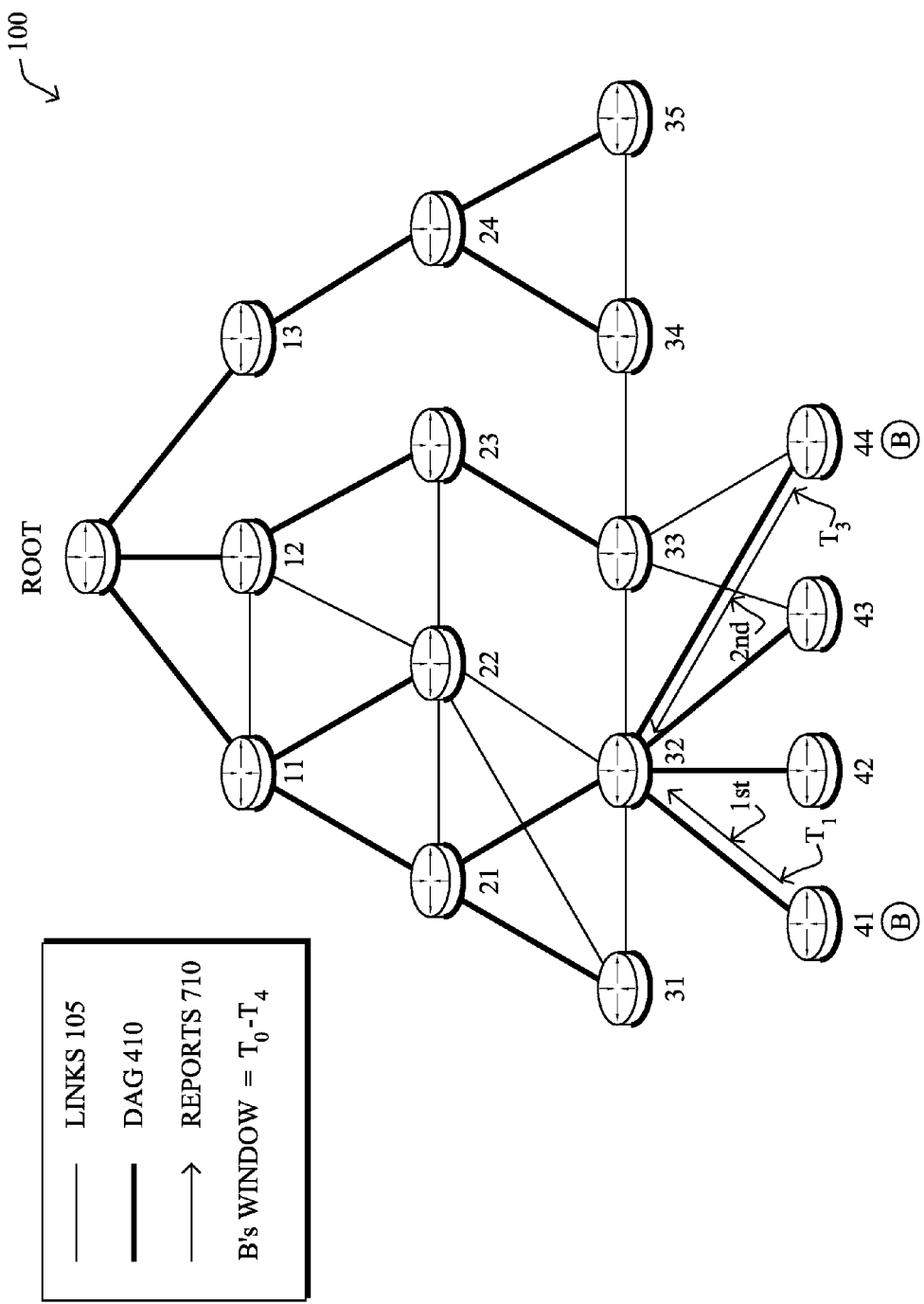
FIG. 10 illustrates another example of reporting timing.

Notably, the assignment of Group B above illustrates potential conflicts within a group. Namely, transmitted reports from node 41 and node 44 may conflict at node 32, as both nodes are in Group B and both are neighbors of parent node 32. In accordance with one or more embodiments herein, to account for these occurrences (e.g., when it is not possible to guarantee path diversity for all nodes in the same reporting group), reporting nodes may send uplink information (reports 710) at random start times within their reporting group's window. In other words, it may be specified (e.g., by the root node or as a general configuration) that reporting nodes within a particular reporting group utilize an individualized (e.g., random) delay time to begin reporting during their respective time windows. In one embodiment, only nodes within certain groups (e.g., "catch-all" groups and/or groups with low traffic nodes and/or leaf nodes) may be configured to add this randomized delay, while in other embodiments, substantially all nodes of all reporting groups may be configured to stagger their transmissions in this manner. FIG. 10 illustrates an example of this delay for Group B, where time window B consists of example times "$T_0$-$T_4$". Accordingly, node 41 may send a report at time $T_1$, while node 44 may transmit at time $T_3$, both within the window for Group B, and not conflicting at node 32.

Figure 11:
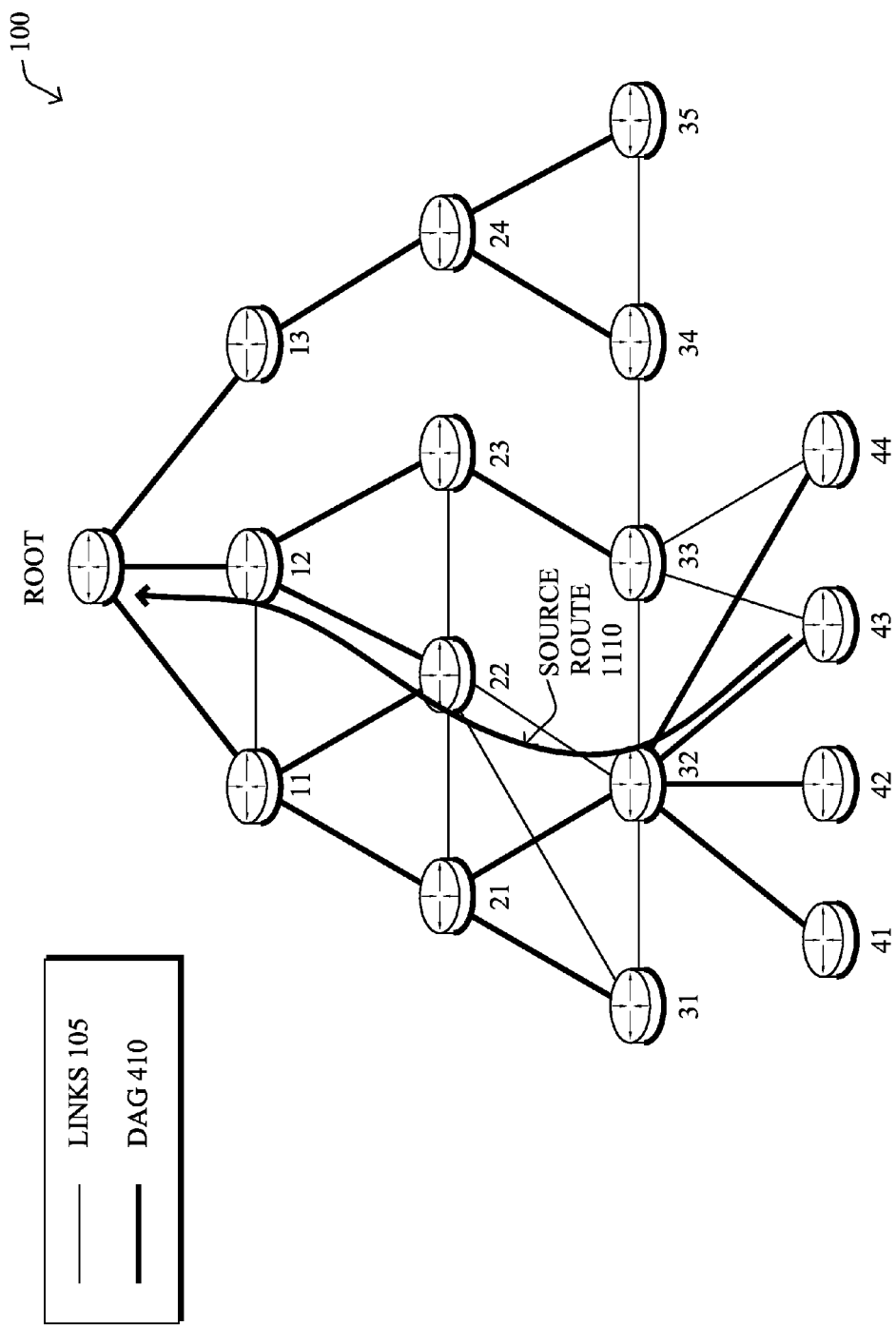
FIG. 11 illustrates an example of source routing.

According to one or more additional embodiments herein, the root node (head-end node) can suggest a route for the reporting nodes to send their reporting data as an alternative to DAG shape modification if the network supports source routing. If this suggestion is accepted, the root node would assign a specific uplink path from the given node towards the root node. In other words, the root node may determine, for one or more particular reporting nodes, a specific route from that respective reporting node to a collecting node (e.g., the root node), and notifies the particular reporting node of the specific route for use with source routing during reporting from the particular reporting node. An example of this is shown in FIG. 11, where reporting node 43 (as one example) may source route its reported information along source routed path 1110 "43-32-22-12-Root", as opposed to its original DAG route of "43-32-21-11-Root".

In accordance with one example embodiment, for instance, the routing consideration (both uplink and downlink) may be based on the delay of each prospective path, such as the delay associated with the timing of the assigned reporting groups. For example, based on the topology of the network and the assignment of nodes to reporting groups, some nodes may have their reporting delayed due to having to wait for each step to take its turn. That is, as mentioned above, certain nodes may take longer to get their freshest data to the collector/root node than other nodes based on the DAG. Accordingly, the source routed path 1110 may bypass the DAG topology in order to provide a better path for certain nodes. As an illustration, a node from reporting group D may prefer a path through reporting group F over a path from reporting group B, as the additional delay imposed by waiting for group F before traversing a next link (D-E-F) would be shorter than the delay imposed by waiting for group B (D-E-F-G-A-B).

Figure 12:
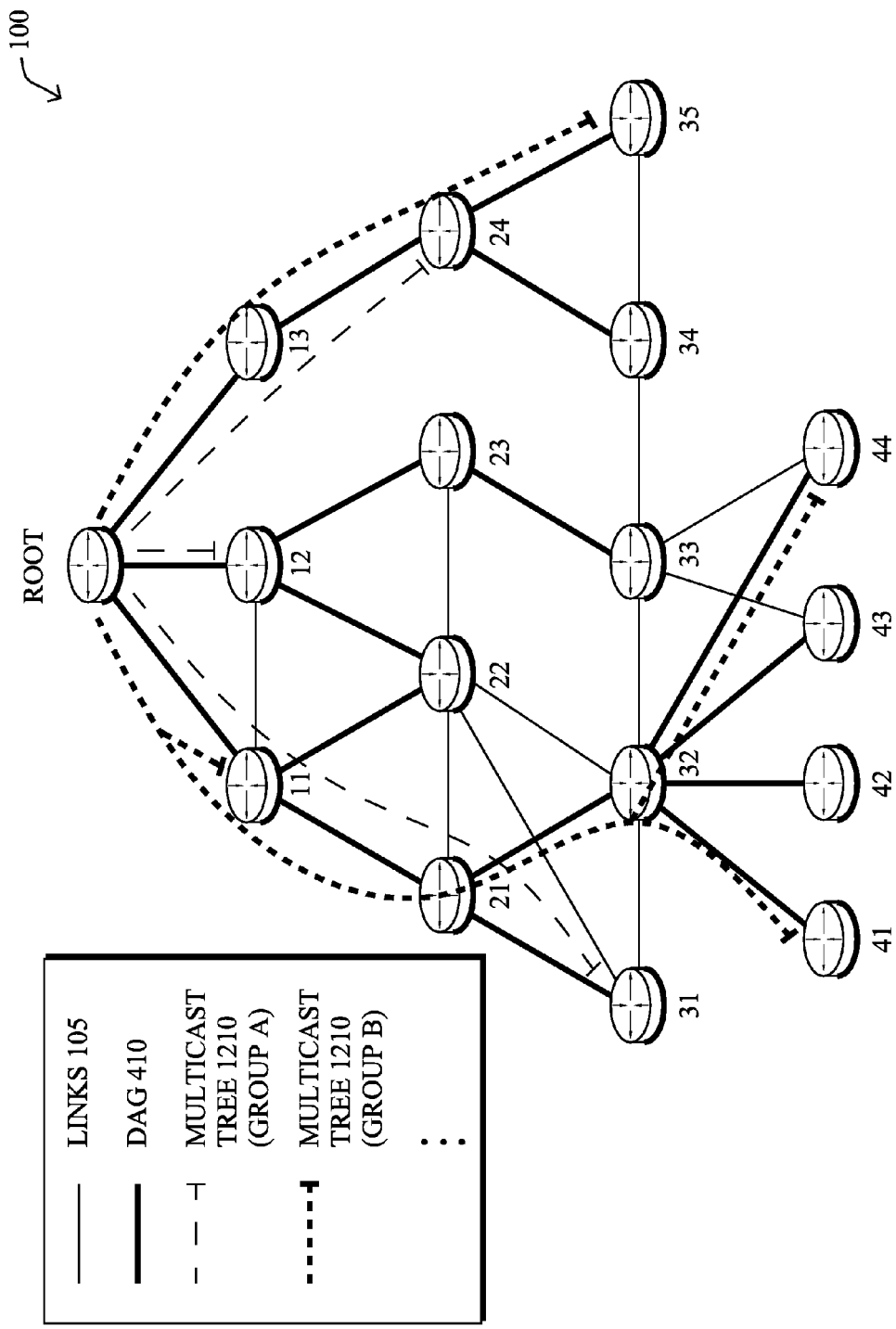
FIG. 12 illustrates an example of multicast trees.

Additionally, in one or more embodiments, multicast groups may be dynamically assigned to reporting nodes that belong to the same reporting group for further communication. For instance, the root node may create a multicast group for each reporting group, and may then utilize a particular multicast group to communicate information to each reporting node of a particular reporting group corresponding to the particular multicast group. An example of this is shown in FIG. 12, where multicast trees 1210 are created for Group A and Group B (merely illustrative), as shown. Example communications that may traverse the multicast trees 1210 may include, e.g., updates to designated time windows, as well as other information. In another example embodiment, given the fact that the multicast tree to any single reporting group may need to traverse via nodes belonging to multiple reporting groups, a single message (albeit broken into multiple packets) may be sent as a multicast message to update the reporting group's parameters for multiple nodes.

Figure 13:
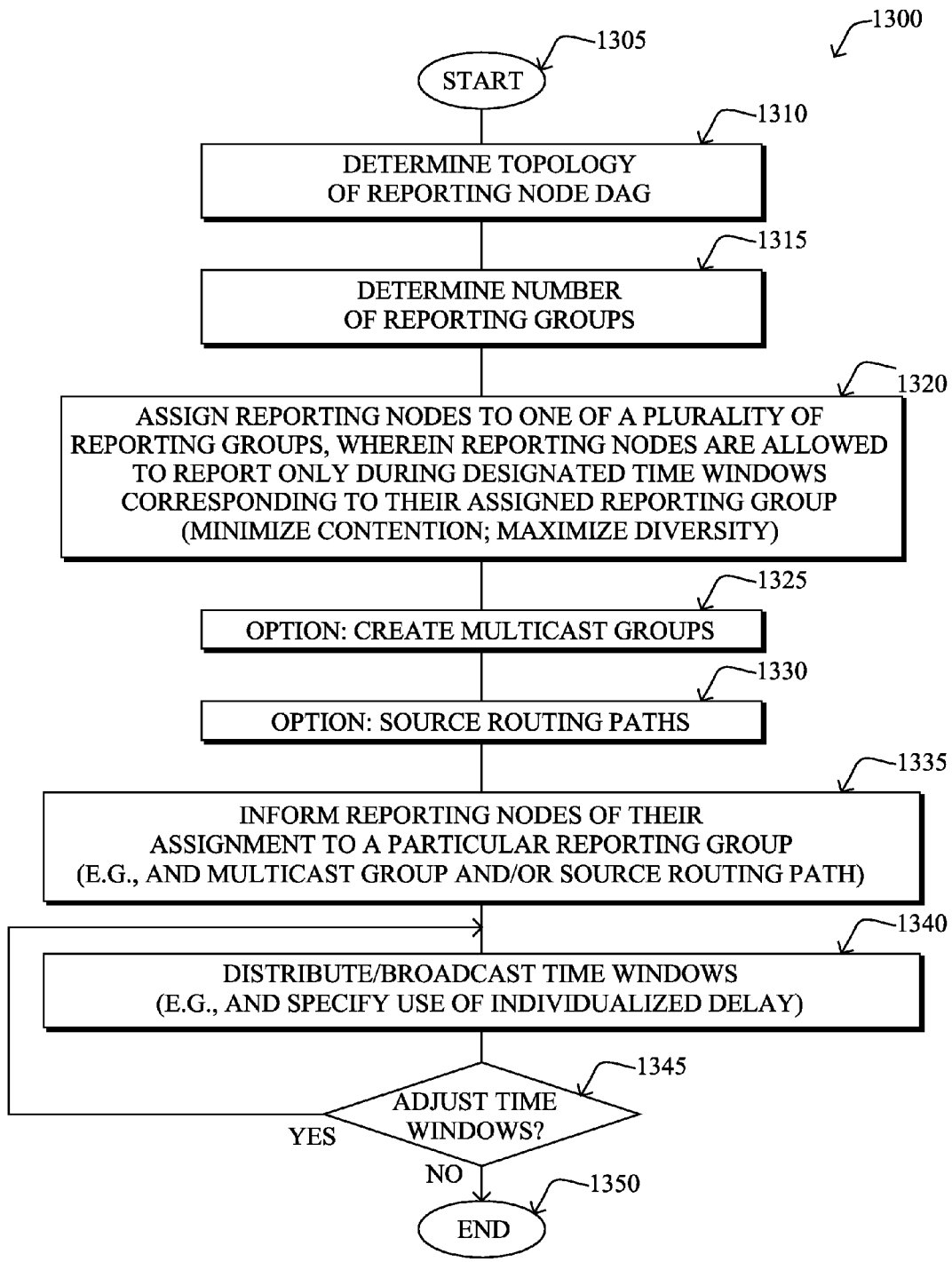
FIG. 13 illustrates an example simplified procedure for reporting group management from the perspective of the root node (or head-end node)

FIG. 13 illustrates an example simplified procedure for reporting group management in accordance with one or more embodiments described herein, e.g., from the perspective of the root node (or head-end node). The procedure 1300 starts at step 1305, and continues to step 1310, where the root node determines the topology of the DAG 410. Also, in step 1315, the root node may determine a certain number of reporting groups to establish, as mentioned above (e.g., based on administrator input and/or dynamically in response to network conditions).

Based on the topology, and based on one or more deciding factors as described in detail above (e.g., minimizing contention; maximizing diversity, etc.), in step 1320 the root node assigns reporting nodes to one of a plurality of reporting groups, which, as described herein, defines designated time windows within which reporting nodes are allowed to report. Optionally, in step 1325, multicast groups may be formed (e.g., as in FIG. 12) for each reporting group. Also optionally, in step 1330, source routing paths may be established for individual reporting nodes (e.g., as in FIG. 11).

In step 1335, the root node may inform the reporting nodes of their assignment to a particular reporting group, as well as, where appropriate, any corresponding multicast groups and/or source routing paths, as mentioned above. In addition, in step 1340, which, notably, may be simultaneous with step 1335 in certain embodiments as described above, the root node distributes/broadcasts the time windows to the reporting nodes corresponding to the reporting groups. In one embodiment, this notification may also specify the use of individualized (e.g., random) delays within a reporting group to further reduce contention/collisions.

If the time windows are not adjusted in step 1345, then the procedure 1300 for the root node ends in step 1350, having established and distributed the reporting groups. However, if in step 1345 the time windows are to be adjusted, such as according to network conditions as mentioned above, then the procedure 1300 may continue to return to step 1340 to distribute new time windows as appropriate. Note also that while the procedure 1300 may end in step 1350 in response to no changes to the time windows, the procedure may restart to step 1305 in response to a topology change (e.g., a significant topology change) within the DAG, where new groups may be established.

Figure 14:
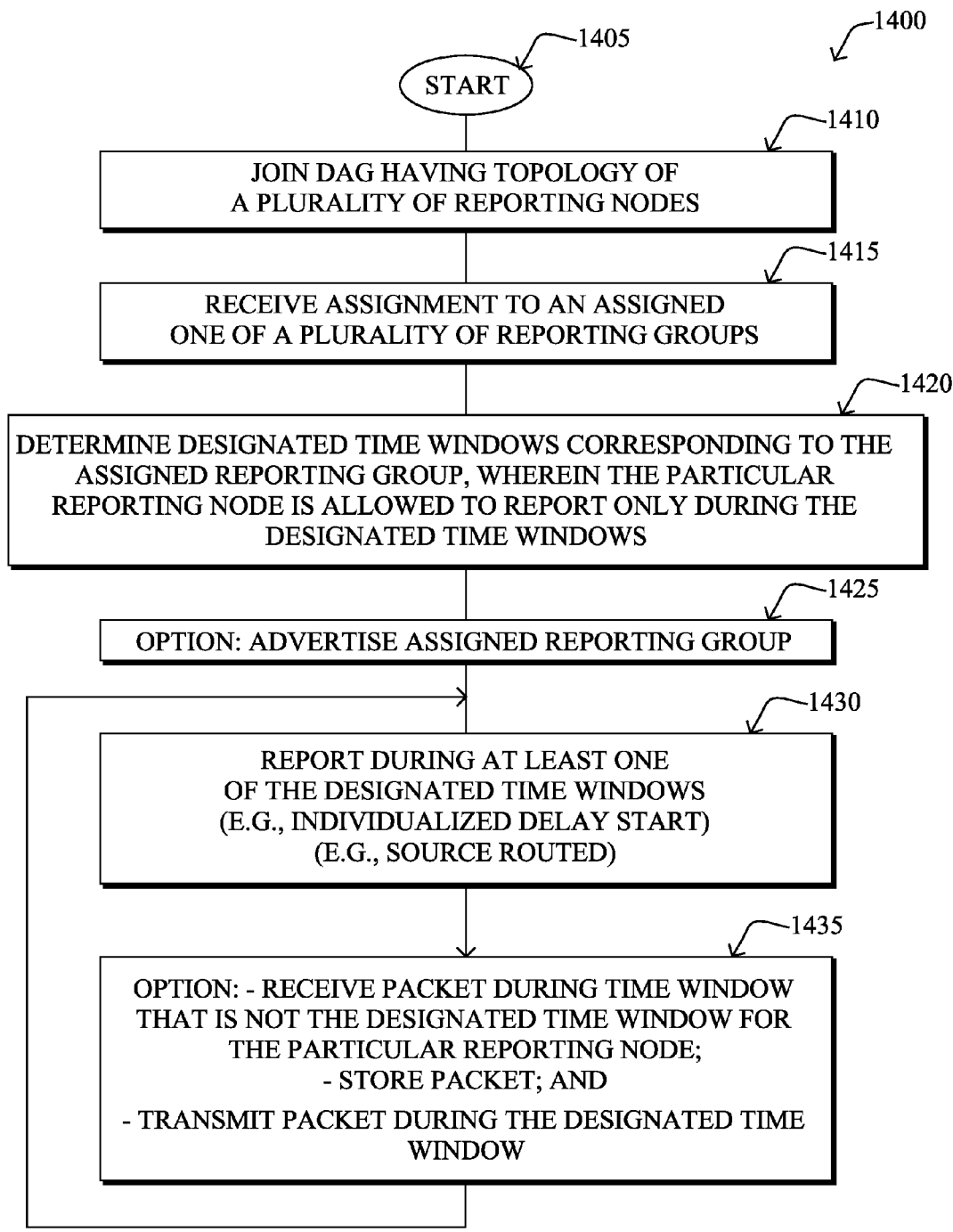
FIG. 14 illustrates an example simplified procedure for reporting group operation from the perspective of the reporting node.

Additionally, FIG. 14 illustrates an example simplified procedure for reporting group operation in accordance with one or more embodiments described herein, e.g., from the perspective of the reporting node. The procedure 1400 starts at step 1405, and continues to step 1410, where the reporting node joins a DAG 410 having a topology of a plurality of reporting nodes. Eventually, as described above in FIG. 13, the reporting node may receive an assignment to an assigned one of a plurality of reporting groups in step 1415. Additionally, e.g., at the same time or at a later time, in step 1420, the reporting node may determine its designated time windows corresponding to the assigned reporting group, i.e., the designated time windows during which the particular reporting node is allowed to report. (Optionally, in step 1425, the reporting node may advertise its assigned reporting group during topology management, as described above.)

During at least one of the designated time windows, the reporting node may report its data in step 1430, illustratively in one embodiment with an individualized (e.g., random) delay start. Also, in certain embodiments noted above, this report/transmission may be based on source routes provided by the root node (e.g., step 1330 of FIG. 13). Step 1435 is an optional step for receiving packets (optional in that leaf nodes may not receive packets, or intermediate nodes may not be configured to operate in this manner). In particular, in step 1435, upon receiving a packet during a time window that is not the designated transmission time window for the particular reporting node, the packet may be stored and transmitted during the next designated transmission time window for the reporting node as described in detail above (e.g., as in FIG. 9).

The procedure 1400 returns to step 1430 from step 1435, where the reporting node may continue to report data during its designated transmission time window. Note that the procedure 1400 may also be triggered to restart in step 1405 in the event of a topology change (joining the new topology in step 1410), or else in response to receiving newly assigned reporting groups (thus bypassing step 1410).

The novel techniques described herein thus provide for efficient data collection through dynamic node synchronization within a mesh network. In particular, by creating reporting groups that may report within given time windows that are correlated with the routing topology of the network, the techniques herein reduce packet contention/collision within a mesh network and increase the reliability of message delivery as well as the efficiency of the network. For instance, the techniques herein provide a flexible mechanism to control the scaling of reporting data messages (e.g., meters, sensors, etc.), and dynamically configures the timing window of sending data uplink. Also, the techniques herein may influence the uplink path reporting data takes in order to minimize collisions with reporting data from other nodes.

While there have been shown and described illustrative embodiments that provide for efficient data collection through dynamic node synchronization within a mesh network, it is to be understood that various other adaptations and modifications may be made within the spirit and scope of the embodiments herein. For example, the embodiments have been shown and described herein with relation to LLNs, and more particular, to the RPL protocol. However, the embodiments in their broader sense are not as limited, and may, in fact, be used with other types of networks and/or protocols, such as those utilizing DAG routing (e.g., distance vector protocols) or IP/MPLS networks where collisions are present. In particular, while reference is made to AMI systems, the techniques are not limited to AMI systems and applies to other systems with similar characteristics regarding reporting data/information (e.g., Smart Cities, Industrial automation, etc.), where data may collected by an application from a very large number of sensors.

Also, while the techniques described above describe performing the reporting group assignment at a root node or other head-end node, one or more aspects of the techniques herein may be performed in a distributed manner by the reporting nodes themselves. For instance, a reporting group ID may be used to derive various timing slots (e.g., ID "1" corresponds to window "1" of known windows, ID "2", to window "2", etc.). Also, in high-visibility DAGs, where each node may be aware of the topology, each reporting node may utilize a same algorithm to determine its own reporting group, that is, assuming each other reporting node in the DAG performs the same algorithm, thus self-assigning to a particular reporting group.

Additionally, it should be noted that while the aforementioned algorithms were described as assigning reporting groups to all nodes, for practical reasons systems may be configured with only a subset of nodes belonging to reporting groups (e.g., only nodes with sufficient memory to store and forward messages, only nodes in high traffic and high collision portions of the DAG, etc.). Additionally, it should be noted that the set of all time windows may not necessarily occupy all available time. Specifically, some time may be reserved for transmission of messages from nodes which have not been assigned into any reporting groups on (albeit, the nodes will need to compete for airtime and packets may collide during that time).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, by a root node, a topology of a plurality of reporting nodes within a directed acyclic graph (DAG) in a computer network;
   assigning, by the root node, each of the reporting nodes to at least one particular reporting group of a plurality of reporting groups based on the topology,
      wherein each of the reporting nodes are grouped so traffic generated by each reporting node in the at least one particular reporting group when reporting has minimal contention with 1) each other reporting node in the at least one particular reporting group and 2) reporting nodes within adjacent reporting groups,
      wherein the root node measures the minimal contention by estimating an amount of contention each of the reporting nodes would have as packets from each of the reporting nodes propagate uplink toward the root node in the DAG, wherein uplink propagation path diversity is maximized between each of the reporting nodes of the at least one particular reporting group; and
   informing, by the root node, the reporting nodes of the reporting groups to which the reporting nodes are assigned, wherein the reporting nodes are allowed to report only during designated time windows corresponding to the reporting groups to which the reporting nodes are assigned; and
   adaptively adjusting, by the root node, the designated time windows for the one or more reporting groups of the plurality of reporting groups to minimize traffic contention between the reporting nodes.

2. The method as in claim 1, further comprising:
   configuring a number of the reporting groups in the computer network to which the reporting nodes are assigned.

3. The method as in claim 1, wherein assigning comprises:
   ensuring that a particular reporting node of the plurality of reporting nodes has sufficient memory for caching reports from child nodes of the particular reporting node.

4. The method as in claim 1, wherein informing comprises:
   specifying, to each reporting node of the plurality of reporting nodes, which reporting group of the plurality of reporting groups that the reporting node has been assigned; and
   broadcasting within the computer network the designated time windows corresponding to each reporting group of the plurality of reporting groups.

5. The method of claim 1, further comprising:
   adjusting the designated time windows for one or more reporting groups of the plurality of reporting groups.

6. The method as in claim 1, further comprising:
   creating a multicast group for the particular reporting group of the plurality of reporting groups; and
   utilizing a particular multicast group to communicate information to each reporting node of the particular reporting group.

7. The method as in claim 1, further comprising:
   specifying that reporting nodes within the at least one particular reporting group of the plurality of reporting groups utilize an individualized delay time to begin reporting during respective time windows.

8. The method as in claim 1, further comprising:
   determining, for a particular reporting node of the plurality of reporting nodes, a specific route from the particular reporting node to a collecting node; and
   notifying the particular reporting node of the specific route for use with source routing during reporting from the particular reporting node.

9. The method as in claim 1, wherein assigning comprises:
   assigning reporting nodes of the plurality of reporting nodes with greater numbers of neighbors to reporting groups of the plurality of reporting groups prior to assigning reporting nodes of the plurality of reporting nodes with lesser numbers of neighbors to reporting groups.

10. An apparatus operating as a root node in a directed acyclic graph (DAG) in a computer network, comprising:
    one or more network interfaces;
    a processor coupled to the network interfaces and adapted to execute one or more processes; and
    a memory configured to store a process executable by the processor, the process when executed operable to:
       determine a topology of a plurality of reporting nodes within the DAG;
       assign each of the reporting nodes to at least one particular reporting group of a plurality of reporting groups based on the topology,
          wherein each of the reporting nodes are grouped so traffic generated by each reporting node in the at least one particular reporting group when reporting has minimal contention with 1) each other reporting node in the at least one particular reporting group and 2) reporting nodes within adjacent reporting groups,
          wherein the minimal contention is measured by estimating an amount of contention each of the reporting nodes would have as packets from each of the reporting nodes propagate uplink toward a root node in the DAG, wherein uplink propagation path diversity is maximized between each of the reporting nodes of the at least one particular reporting group;
       inform the reporting nodes of the reporting groups to which the reporting nodes are assigned, wherein the reporting nodes are allowed to report only during designated time windows corresponding to the reporting groups to which the reporting nodes are assigned; and
       adaptively adjust the designated time windows for the one or more reporting groups of the plurality of reporting groups to minimize traffic contention between the reporting nodes.

11. The apparatus as in claim 10, wherein the process when executed to assign is operable to:
ensure that a particular reporting node of the plurality of reporting nodes has sufficient memory for caching reports from child nodes of the particular reporting node.

12. The apparatus as in claim 10, wherein the process when executed is further operable to:
determine, for a particular reporting node of the plurality of reporting nodes, a specific route from the particular reporting node to a collecting node; and
notify the particular reporting node of the specific route for use with source routing during reporting from the particular reporting node.

13. A method, comprising:
joining, by a particular reporting node, a directed acyclic graph (DAG) having a topology of a plurality of reporting nodes within a computer network;
receiving, at the particular node, an assignment for the particular reporting node to an assigned at least one particular reporting group of a plurality of reporting groups based on the topology
wherein each of the reporting nodes are grouped so traffic generated by each reporting node in the at least one particular reporting group when reporting has minimal contention with 1) each other reporting node in the at least one particular reporting group and 2) reporting nodes within adjacent reporting groups,
wherein a root node of the DAG measures the minimal contention by estimating an amount of contention each of the reporting nodes would have as packets from each of the reporting nodes propagate uplink toward the root node, wherein uplink propagation path diversity is maximized between each of the reporting nodes of the at least one particular reporting group;
determining, by the particular node, designated time windows corresponding to the assigned reporting group, wherein the particular reporting node is allowed to report only during the designated time windows; and
reporting, from the particular reporting node, during at least one of the designated time windows.

14. The method as in claim 13, further comprising:
receiving a packet during a time window that is not the designated time window for the particular reporting node;
storing the packet in response to the time window that is not the designated time window; and
transmitting the packet during the designated time window for the particular reporting node.

15. The method as in claim 13, further comprising:
receiving a specific route from the particular reporting node to a collecting node of the DAG; and
utilizing the specific route within one or more source routed packets during reporting from the particular reporting node.

16. The method as in claim 13, further comprising:
utilizing, by the particular reporting node, an individualized delay time to begin reporting during the designated time windows.

17. The method as in claim 13, further comprising:
advertising the assigned reporting group of the particular reporting node within neighbor discovery messages of the particular reporting node.

18. An apparatus, comprising:
one or more network interfaces configured to communicate in a directed acyclic graph (DAG) having a topology of a plurality of reporting nodes within a computer network;
a reporting module configured to generate report information;
a processor coupled to the network interfaces and adapted to execute one or more processes; and
a memory configured to store a process executable by the processor, the process when executed operable to:
join the DAG;
receive an assignment for the particular reporting node to an assigned at least one particular reporting group of a plurality of reporting groups based on the topology,
wherein each of the reporting nodes are grouped so traffic generated by each reporting node in the at least one particular reporting group when reporting has minimal contention with 1) each other reporting node in the at least one particular reporting group and 2) reporting nodes within adjacent reporting groups,
wherein a root node of the DAG measures the minimal contention by estimating an amount of contention each of the reporting nodes would have as packets from each of the reporting nodes propagate uplink toward the root node, wherein uplink propagation path diversity is maximized between each of the reporting nodes of the at least one particular reporting group;
determine designated time windows corresponding to the assigned reporting group, wherein the apparatus is allowed to report only during the designated time windows; and
report the information during at least one of the designated time windows.

19. The apparatus as in claim 18, wherein the process when executed is further operable to:
receive a packet during a time window that is not the designated time window for the apparatus;
store the packet in response to the time window that is not the designated time window; and
transmit the packet during the designated time window.

20. The apparatus as in claim 18, wherein the process when executed is further operable to:
receive a specific route from the apparatus to a collecting node of the DAG; and
utilize the specific route within one or more source routed packets during reporting from the apparatus.

\* \* \* \* \*